US010027003B2

(12) United States Patent
Toshioka et al.

(10) Patent No.: US 10,027,003 B2
(45) Date of Patent: Jul. 17, 2018

(54) ENERGY STORAGE APPARATUS

(71) Applicants: GS Yuasa International Ltd., Kyoto-shi, Kyoto (JP); Honda Motor Co., Ltd., Tokyo (JP)

(72) Inventors: Yoshimasa Toshioka, Kyoto (JP); Yosuke Nishimura, Kyoto (JP); Masao Kawata, Saitama (JP); Jun Machida, Saitama (JP)

(73) Assignees: GS YUASA INTERNATIONAL LTD., Kyoto-Shi, Kyoto (JP); HONDA MOTOR CO., LTD., Tokyo (JP)

( * ) Notice: Subject to any disclaimer, the term of this patent is extended or adjusted under 35 U.S.C. 154(b) by 325 days.

(21) Appl. No.: 14/811,681

(22) Filed: Jul. 28, 2015

(65) Prior Publication Data
US 2016/0036105 A1 Feb. 4, 2016

(30) Foreign Application Priority Data

Jul. 30, 2014 (JP) .................. 2014-155014
Jul. 30, 2014 (JP) .................. 2014-155015

(51) Int. Cl.
| *H01M 10/6566* | (2014.01) |
| *H01M 2/10* | (2006.01) |
| *H01M 10/625* | (2014.01) |
| *H01M 10/647* | (2014.01) |
| *H01M 10/6557* | (2014.01) |

(Continued)

(52) U.S. Cl.
CPC ..... *H01M 10/6566* (2015.04); *H01M 2/1077* (2013.01); *H01M 10/613* (2015.04); *H01M 10/625* (2015.04); *H01M 10/647* (2015.04); *H01M 10/6557* (2015.04); *H01M 10/6561* (2015.04)

(58) Field of Classification Search
CPC ........... H01M 10/6566; H01M 10/613; H01M 10/6561; H01M 10/6557; H01M 10/625; H01M 2/1077; H01M 10/647
See application file for complete search history.

(56) References Cited

U.S. PATENT DOCUMENTS

2007/0037051 A1  2/2007  Kim et al.
2010/0190050 A1  7/2010  Ochi
(Continued)

FOREIGN PATENT DOCUMENTS

JP    2007-048750 A    2/2007
JP    2007-280858 A    10/2007
(Continued)

*Primary Examiner* — Lisa S Park
(74) *Attorney, Agent, or Firm* — McGinn IP Law Group, PLLC

(57) ABSTRACT

Provided is an energy storage apparatus which includes: an energy storage device; and a first spacer and a second spacer that sandwich the electric storage device, wherein each of the spacers includes: a passage forming portion that forms a passage for passing cooling air in a second direction that is perpendicular to a first direction in which the energy storage device and the spacers are arranged; and a passage blocking portion disposed at one end in the second direction, and wherein, in a view along a third direction perpendicular to the first and second directions, the passage blocking portion of one of the spacers and the passage blocking portion of the other of the spacers overlap.

20 Claims, 13 Drawing Sheets

(51) Int. Cl.
*H01M 10/6561* (2014.01)
*H01M 10/613* (2014.01)

(56) References Cited

U.S. PATENT DOCUMENTS

| | | | |
|---|---|---|---|
| 2011/0223462 A1 | 9/2011 | Kim et al. | |
| 2012/0052359 A1* | 3/2012 | Yoshitake | H01M 2/1077 |
| | | | 429/120 |
| 2012/0315519 A1 | 12/2012 | Jin | |
| 2014/0302378 A1 | 10/2014 | Tsuruta et al. | |
| 2015/0037631 A1 | 2/2015 | Lee et al. | |
| 2015/0236325 A1* | 8/2015 | Miller | H01M 2/18 |
| | | | 429/50 |

FOREIGN PATENT DOCUMENTS

| | | |
|---|---|---|
| JP | 2009-170258 A | 7/2009 |
| JP | 2009-277471 A | 11/2009 |
| JP | 2010-176997 A | 8/2010 |
| JP | 2012-119157 A | 6/2012 |
| JP | 2012-256465 A | 12/2012 |
| JP | 2013-004341 A | 1/2013 |
| JP | 2013-004523 A | 1/2013 |
| JP | 2013-235728 A | 11/2013 |
| JP | 2014-035971 A | 2/2014 |
| JP | 2014-220234 A | 11/2014 |
| JP | 2015-032586 A | 2/2015 |
| WO | WO-2010/131700 A1 | 11/2010 |

* cited by examiner

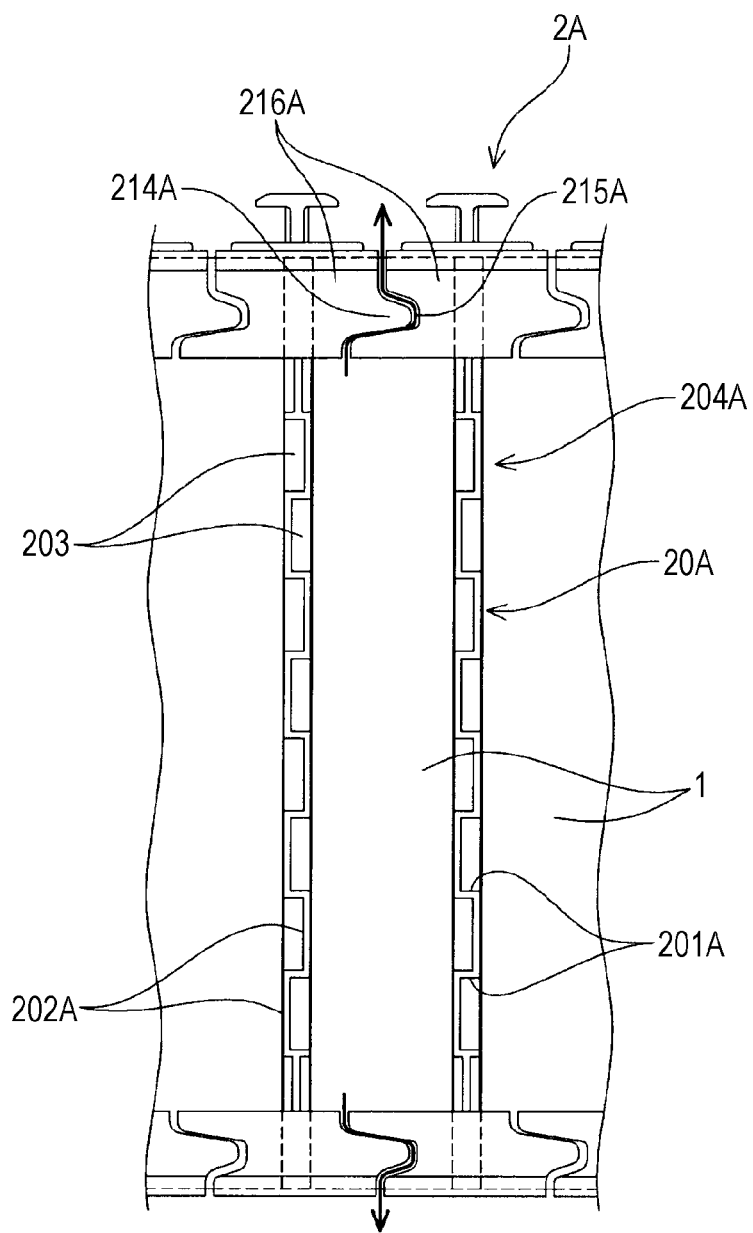

ENERGY STORAGE APPARATUS

CROSS-REFERENCE TO RELATED APPLICATIONS

This application claims the benefit of Japanese patent applications No. 2014-155014 and No. 2014-155015, filed on Jul. 30, 2014, which are incorporated by reference.

FIELD

The present invention relates to an energy storage apparatus which includes an energy storage device.

BACKGROUND

An electric vehicle requires a power source having a large capacity and hence, an energy storage apparatus provided with a plurality of battery cells is used (see JP-A-2009-170258). As shown in FIG. 12, the energy storage apparatus of this type includes: a battery stack (not shown in the figure) formed by stacking a plurality of battery cells 33; a battery holder (not shown in the figure) which is disposed outside of the battery stack and fixes the stacked battery cells 33; and spacers 15 each of which is sandwiched between the stacked battery cells 33.

In the energy storage apparatus of this type, a cooling gap 50 through which cooling air flows in a direction orthogonal to a direction along which the battery cells 33 and the spacers 15 are arranged in a row is formed between the battery cells 33 and the spacer 15 arranged adjacently to the battery cells 33. Cooling air flows through the cooling gap 50 and cools the battery cells 33.

In the energy storage apparatus of this type, there may be a case where a gap is formed between the spacer 15 and another spacer 15 arranged adjacently to each other in a state where the battery cells 33 are assembled to each other.

Accordingly, in the energy storage apparatus of this type, a part of cooling air leaks to the outside through a gap 55 before cooling air contributes to the cooling of the battery cell 33 (before cooling air flows into the cooling gap 50) thus giving rise to a drawback that an effect of cooling the battery cell 33 is not improved.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of a present invention to provide an energy storage apparatus which can suppress lowering of cooling efficiency even when a gap is formed between spacers arranged adjacently to each other in a state where energy storage devices are assembled to each other.

An energy storage apparatus according to an aspect of the present invention includes: an energy storage device; and a first spacer and a second spacer that sandwich the electric storage device, wherein each of the spacers includes: a passage forming portion that forms a passage for passing cooling air in a second direction that is perpendicular to a first direction in which the energy storage device and the spacers are arranged; and a passage blocking portion disposed at one end in the second direction, and wherein, in a view along a third direction perpendicular to the first and second directions, the passage blocking portion of one of the spacers and the passage blocking portion of the other of the spacers overlap.

BRIEF DESCRIPTION OF DRAWINGS

The foregoing and other features of the present invention will become apparent from the following description and drawings of an illustrative embodiment of the invention in which:

FIG. 8 is a side view of a part of the energy storage apparatus according to the embodiment describing a state where the spacers are arranged with the energy storage device sandwiched therebetween.

DESCRIPTION OF EMBODIMENTS

Figure 1:
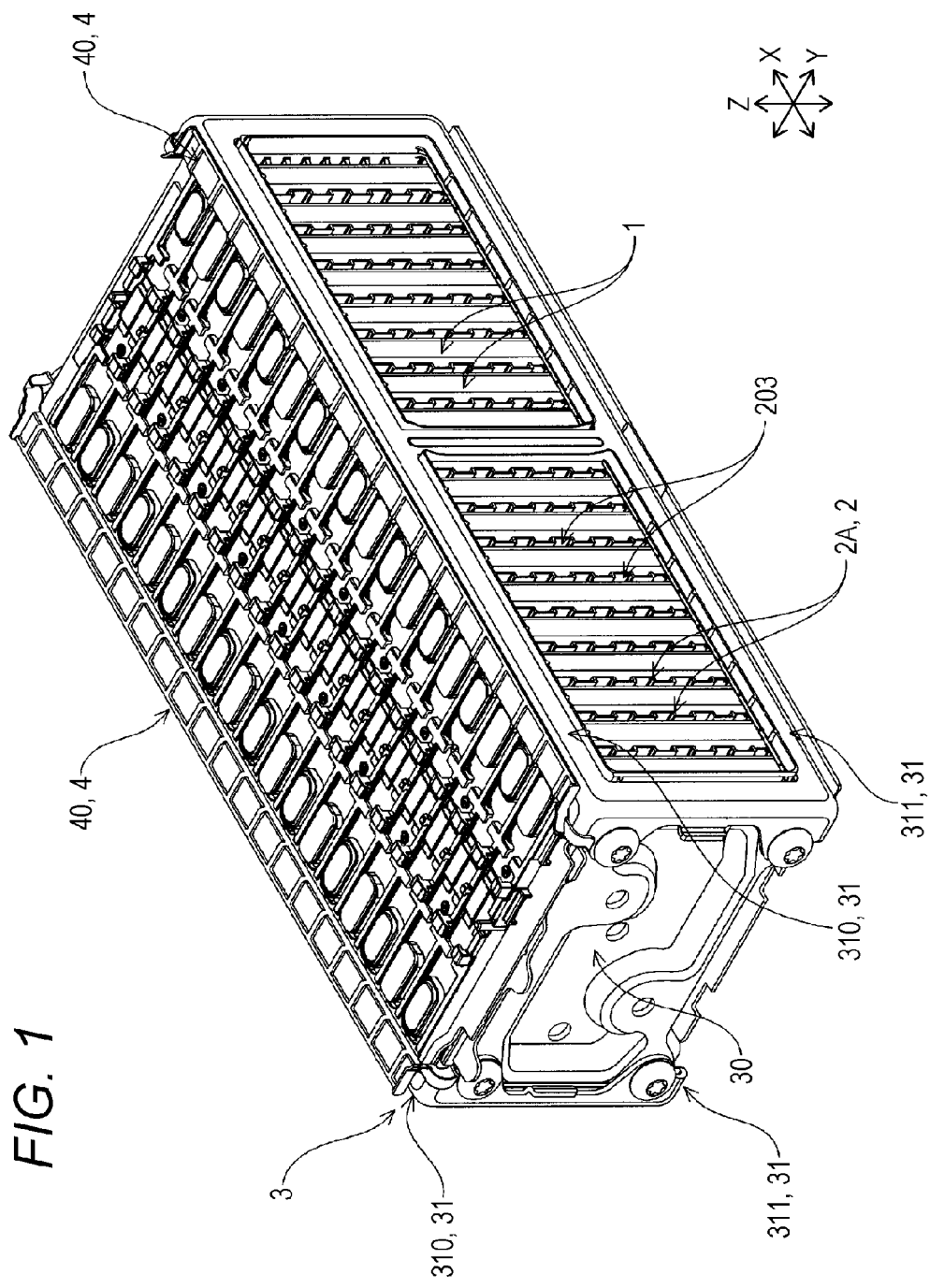
FIG. 1 is a perspective view of an energy storage apparatus according to one embodiment of the present invention.

According to an aspect of the present invention, there is provided an energy storage apparatus which includes: an energy storage device; and a first spacer and a second spacer that sandwich the electric storage device, wherein each of the spacers includes: a passage forming portion that forms a passage for passing cooling air in a second direction that is perpendicular to a first direction in which the energy storage device and the spacers are arranged; and a passage blocking portion disposed at one end in the second direction, and wherein, in a view along a third direction perpendicular to the first and second directions, the passage blocking portion of one of the spacers and the passage blocking portion of the other of the spacers overlap.

With such a configuration, the passage blocking portion of the one spacer and the passage blocking portion of the other spacer overlap with each other in the third direction. The length of the overlapping portion in the third direction is elongated compared to a case where the lengths (heights) of the passage blocking portions in the third direction are equal and the overlapping portion extends straightly in the third direction (the length of the overlapping portion becomes a shortest distance in the third direction). Accordingly, when a fluid flows through the overlapping portion, resistance is increased and hence, a pressure loss of the fluid is increased. Accordingly, it is difficult for the fluid to pass through the overlapping portion. As a result, when a gap is formed in the overlapping portion in a state where the energy storage devices are assembled to each other or in a case where a gap is formed in the overlapping portion due to the expansion attributed to charging of the energy storage device, the reduction of the amount of cooling air which contributes to the cooling of the energy storage device can be prevented. Further, the distance along which a fluid flows can be elongated without changing the length (height) of the passage blocking portion in the third direction. Accordingly, lowering of cooling efficiency by cooling air can be suppressed without increasing the size of the passage blocking portion.

In this case, the spacer may include at least one projecting portion which projects in the second direction from the passage blocking portion and is brought into contact with the energy storage device which faces the passage blocking portion in an opposed manner.

With such a configuration, the projecting portion which projects in the second direction partially closes a gap formed between the energy storage device and the passage blocking portion. Accordingly, it is possible to prevent a fluid from flowing between the energy storage device and the passage blocking portion.

In this case, the projecting portion of the passage blocking portion of the one spacer and the projecting portion of the passage blocking portion of the other spacer may be arranged so as to partially overlap with each other as viewed in the third direction.

With such a configuration, when a gap is formed between the projecting portion and another projecting portion which face each other in an opposed manner, the gap is formed in a penetrating manner in the third direction while having a roundabout portion at the middle. A fluid which flows into the gap between the passage blocking portion and the energy storage device impinges on the projecting portion at the roundabout portion of the gap. When the fluid impinges on the projecting portion, a pressure loss is generated. Further, when the gap has the roundabout portion at the middle in the third direction, a distance along which a fluid flows is elongated. Accordingly, resistance is increased and a pressure loss of a fluid is increased. Therefore, it becomes difficult for the fluid to flow through the gap formed between the passage blocking portion and the energy storage device. As a result, the reduction of cooling air which contributes to cooling of the energy storage device can be prevented. Accordingly, lowering of cooling efficiency by cooling air can be suppressed.

In this case, the passage blocking portion of the one spacer may include a projection which projects toward the passage blocking portion of the other spacer, and the passage blocking portion of the other spacer may include a recess corresponding to the projection.

With such a configuration, when a gap is formed between the projection and the recess, the gap is formed in a penetrating manner in the third direction while having a roundabout portion at the middle. A fluid which flows into the gap impinges on a passage wall at the gap roundabout portion. When the fluid impinges on the passage wall, a pressure loss is generated. That is, when the roundabout portion exists in the gap formed between the projection and the recess, resistance is increased and a pressure loss of the fluid is increased. Further, when the gap has the roundabout portion at the middle in the third direction, a distance along which a fluid flows is elongated and hence, a pressure loss can be further increased. Accordingly, also in the case where the gap is formed between the projection and the recess, it becomes more difficult for the fluid to flow through the gap. As a result, the reduction of the amount of cooling air which contributes to the cooling of the energy storage device can be prevented. Accordingly, lowering of cooling efficiency by cooling air can be further suppressed.

As has been described above, according to the aspects of the present invention, it is possible to provide an energy storage apparatus where lowering of cooling efficiency can be suppressed even when a gap is formed between spacers arranged adjacently to each other in a state where energy storage devices are assembled to each other.

Hereinafter, one embodiment of an energy storage apparatus of the present invention is described by reference to drawings. Names of respective components (respective constitutional elements) in this embodiment are used only for this embodiment, and may differ from names of respective components (respective constitutional elements) in Background.

As shown in FIG. 1, an energy storage apparatus includes: energy storage devices 1; spacers 2 which are arranged adjacently to the energy storage devices 1; and a holder 3 which collectively holds the energy storage devices 1 and the spacers 2. The holder 3 is formed by molding using an electrically conductive material. In view of such a configuration, the energy storage apparatus also includes insulators 4 which are arranged between the energy storage devices 1 and the holder 3.

Figure 2:
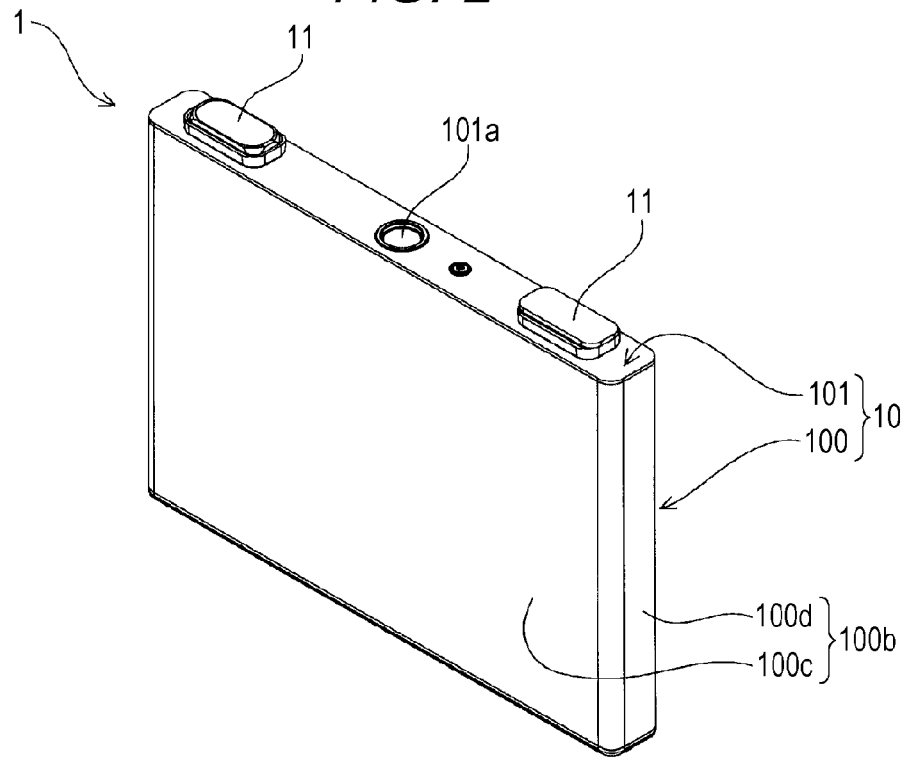
FIG. 2 is a perspective view of an energy storage device in the energy storage apparatus according to the embodiment.
Figure 3:
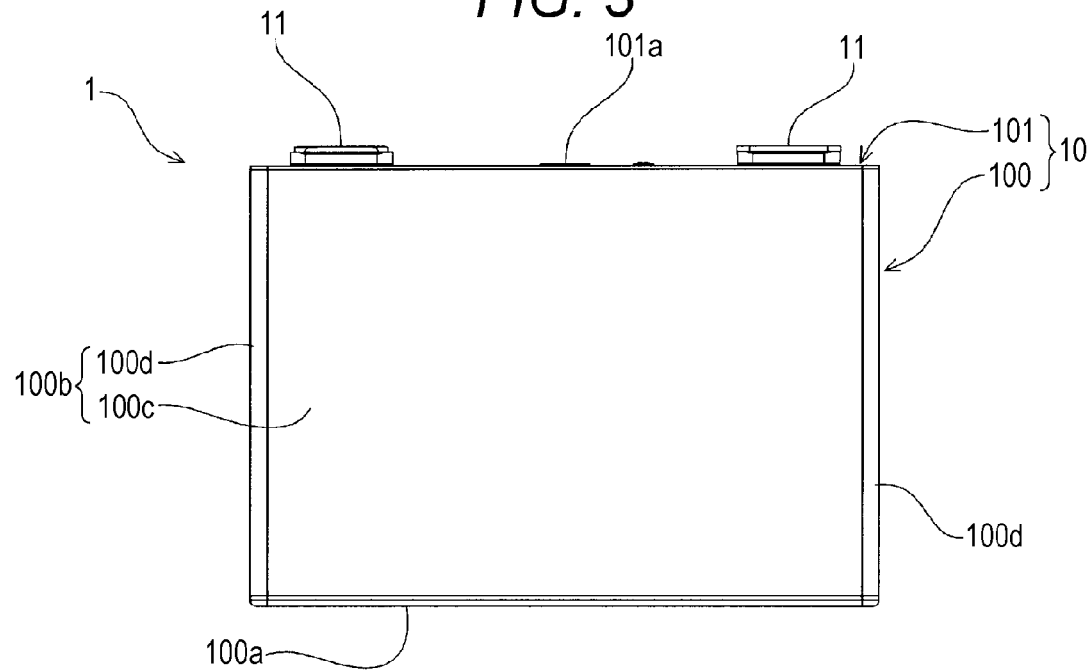
FIG. 3 is a front view of the energy storage device in the energy storage apparatus according to the embodiment.

As shown in FIG. 2 and FIG. 3, the energy storage device 1 includes: an electrode assembly which includes a positive electrode and a negative electrode; a case 10 which houses the electrode assembly; and a pair of external terminals 11 arranged on an outer surface of the case 10.

The case 10 includes: a case body 100 having an opening; and a lid plate 101 which closes the opening of the case body 100, and the pair of external terminals 11 is arranged on an outer surface of the lid plate 101.

The case body 100 includes: a closing portion 100a (see FIG. 3); and a cylindrical barrel portion 100b which is connected to a periphery of the closing portion 100a so as to surround the closing portion 100a.

The barrel portion 100b includes: a pair of first walls 100c which faces each other with a distance therebetween; and a pair of second walls 100d which faces each other with the pair of first walls 100c interposed therebetween.

The first wall 100c and the second wall 100d are each formed into a rectangular shape. That is, respective surfaces of the first wall 100c and the second wall 100d are flat surfaces and each form a rectangular region. The first wall 100c and the second wall 100d are arranged adjacently to each other in a state where respective edges of the first and second walls 100c, 100d abut each other. Due to such an arrangement, the edge of the first wall 100c and the edge of the second wall 100d arranged adjacently to each other are connected to each other over the whole length. Accordingly, the barrel portion 100b is formed into an angular cylindrical shape. One end of the barrel portion 100b is closed by the closing portion 100a. On the other hand, the other end of the barrel portion 100b is opened and is closed by the lid plate 101.

In this embodiment, a surface area of the first wall 100c is set larger than a surface area of the second wall 100d. In view of such a configuration, the barrel portion 100b is formed into a flat angular cylindrical shape.

The energy storage apparatus according to this embodiment includes a plurality of energy storage devices 1 which form an energy storage device group. The plurality of energy storage devices 1 are arranged in a row in one direction. In this embodiment, the plurality of the energy storage devices 1 are arranged in a row in a state where the first walls 100c of the cases 10 are directed in one direction. The energy storage apparatus includes a bus bar which electrically connects the external terminals 11 of every two energy storage devices 1 arranged adjacently to each other.

In the description made hereinafter, for the sake of convenience, the direction along which the energy storage devices 1 are arranged in a row (first direction) is referred to as an X axis direction. Further, out of two axial directions which are orthogonal to the direction along which the energy storage devices 1 are arranged in a row (X axis direction), one direction (second direction) is referred to as a Y axis direction, and the remaining one direction (third direction) is referred to as a Z axis direction. In accordance with such a coordinate system, in the drawings, respective three orthogonal axes which correspond to the X axis direction, the Y axis direction and the Z axis direction (coordinate axes) are described complementarily.

The spacer 2 has an insulating property. The spacer 2 includes: a base which is arranged adjacently to the case 10 (the first wall 100c of the barrel portion 100b) of the energy storage device 1; and a blocking portion which prevents the positional displacement of the energy storage device 1 arranged adjacently to the base.

Figure 4:
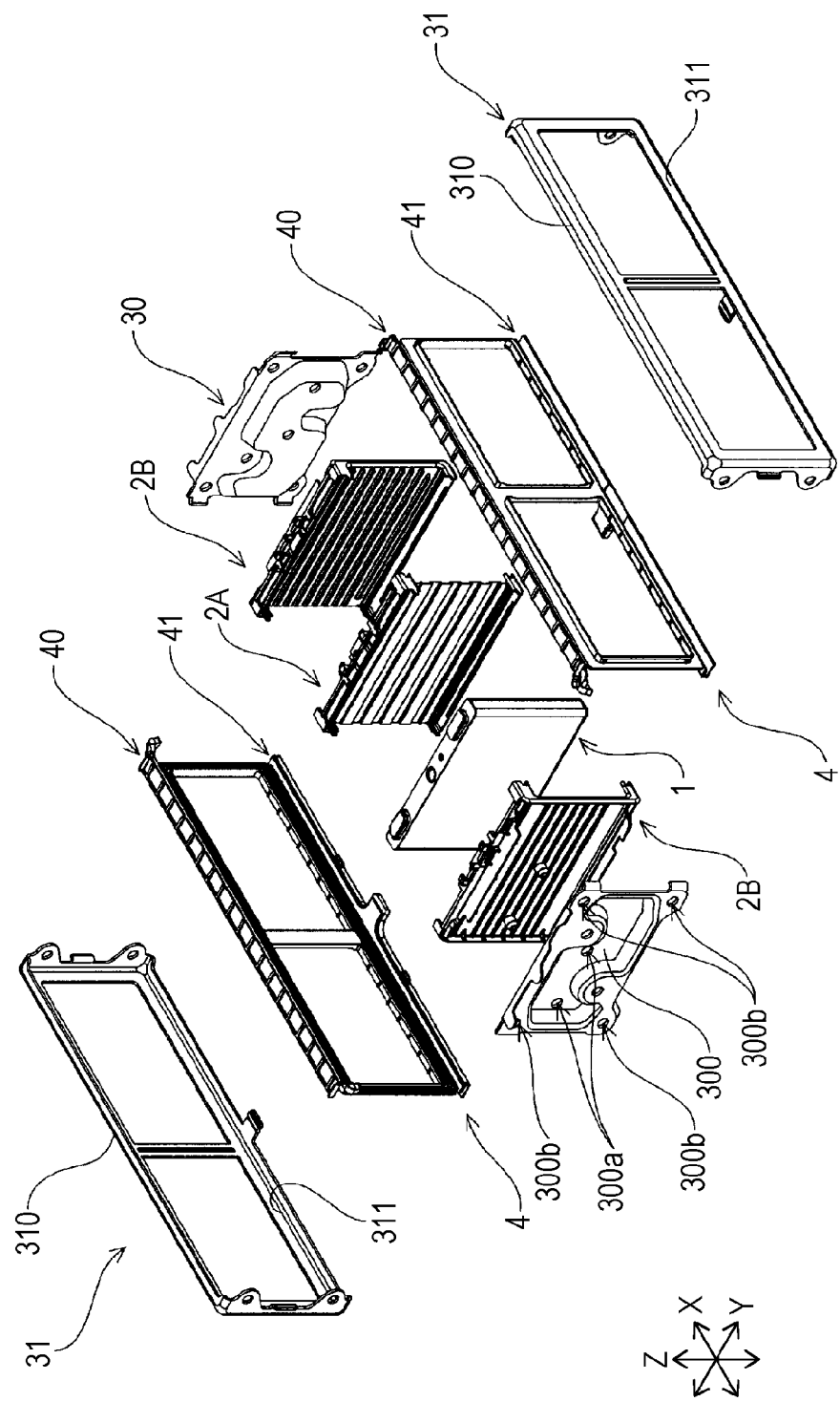
FIG. 4 is a perspective view of the energy storage apparatus according to the embodiment.

The spacer 2 is described more specifically. As described above, the energy storage apparatus includes the plurality of energy storage devices 1. In accordance with such a configuration, as shown in FIG. 4, the energy storage apparatus includes two kinds of spacers 2 (2A, 2B). That is, the energy storage apparatus includes, as the spacers 2, spacers 2A each of which is arranged between every two energy storage devices 1 (hereinafter referred to as "inner spacers 2A"), and spacers 2B arranged adjacently to the energy storage devices 1 disposed at the outermost ends among the plurality of energy storage devices 1 (hereinafter referred to as "outer spacers 2B").

Figure 5:
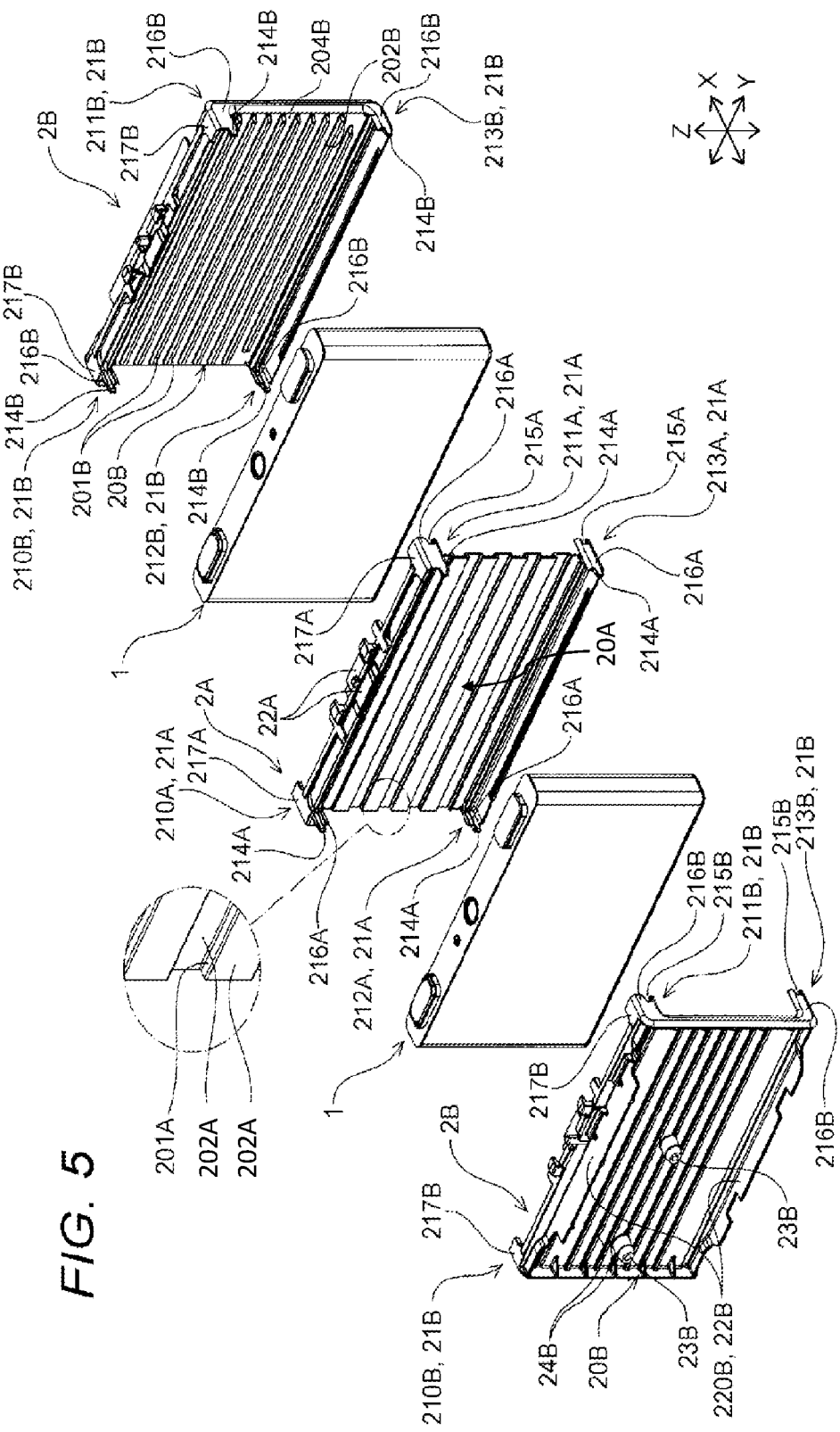
FIG. 5 is a perspective view of an inner spacer, outer spacers and the energy storage devices in the energy storage apparatus according to the embodiment.
Figure 6:
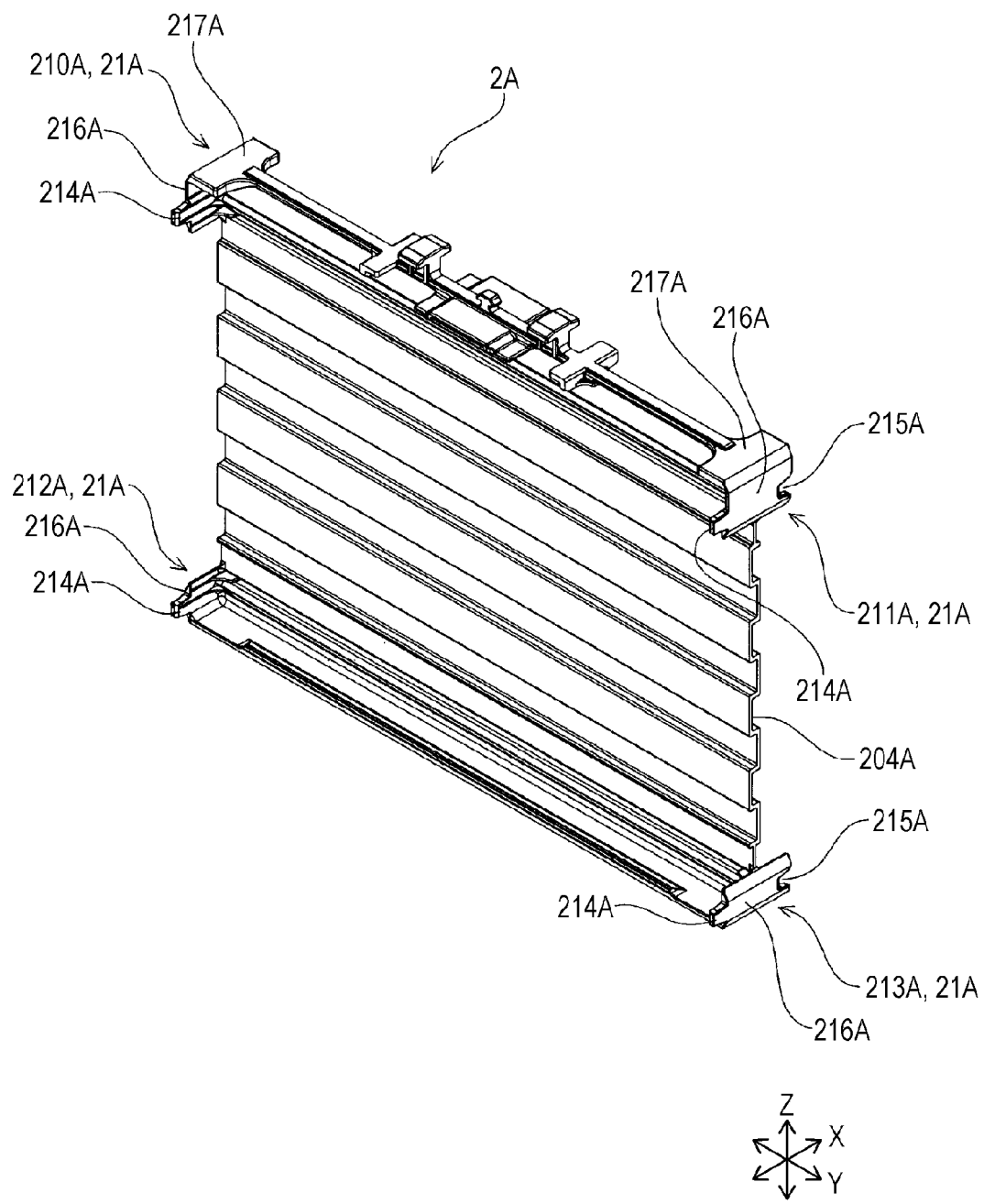
FIG. 6 is a perspective view of the inner spacer of the energy storage apparatus according to the embodiment.

Firstly, the inner spacer 2A is described. As shown in FIG. 5, the inner spacer 2A includes: a base 20A arranged adjacently to the energy storage device 1 (the first wall 100c of the case body 100); and a blocking portion 21A which prevents the positional displacement of two energy storage devices 1 arranged adjacently to the base 20A. The inner spacer 2A also includes a vent cover portion 22A projecting from the base 20A and arranged above the lid plate 101 (gas release vent 101a) of the energy storage device 1.

The base 20A of the inner spacer 2A is sandwiched between two energy storage devices 1. Accordingly, the base 20A of the inner spacer 2A has: a first surface which faces one energy storage device 1 in an opposed manner out of the two energy storage devices 1 arranged adjacently to the inner spacer 2A; and a second surface which is disposed on a side opposite to the first surface and faces the other energy storage device 1 in an opposed manner out of the two energy storage devices 1.

The base 20A of the inner spacer 2A has: a first end arranged at a position corresponding to the lid plate 101 of the energy storage device 1: and a second end disposed on a side opposite to the first end and arranged at a position corresponding to the closing portion 100a of the energy storage device 1. The base 20A of the inner spacer 2A also has: a third end arranged at a position corresponding to one second wall 100d of the energy storage device 1; and a fourth end disposed on a side opposite to the third end and arranged at a position corresponding to the other second wall 100d of the energy storage device 1.

The base 20A of the inner spacer 2A has: a first corner portion where the first end and the third end of the base 20A are connected to each other; and a second corner portion where the first end and the fourth end of the base 20A are connected to each other. The base 20A of the inner spacer 2A also has: a third corner portion where the second end and the third end of the base 20A are connected to each other; and a fourth corner portion where the second end and the fourth end of the base 20A are connected to each other.

The first end and the second end of the base 20A of the inner spacer 2A extend in the Y axis direction. The third end and the fourth end of the base 20A of the inner spacer 2A extend in the Z axis direction. Accordingly, the base 20A of the inner spacer 2A is formed into an approximately rectangular shape. The base 20A of the inner spacer 2A is formed so as to have a size substantially equal to the size of the first wall 100c of the energy storage device 1.

In the energy storage apparatus according to this embodiment, passages 203 which allow a fluid (a fluid for cooling, hereinafter referred to as "cooling air") to pass therethrough are formed between the first surface of the base 20A of the inner spacer 2A and the energy storage device 1 as well as between the second surface of the base 20A of the inner spacer 2A and the energy storage device 1.

That is, the base 20A of the inner spacer 2A is configured to form the passages 203 through which cooling air for cooling the energy storage device 1 arranged adjacently to the inner spacer 2A flows together with the energy storage device 1. The configuration is described more specifically. The base 20A includes a passage forming portion 204A which forms the passages 203 extending in the Y axis direction together with an energy storage device 1 arranged adjacently to the base 20A. The passage forming portion 204A includes: at least two support portions 201A arranged at an interval in the Z axis direction; and a connecting portion 202A which extends in the Z axis direction and connects at least two support potions 201A to each other.

The support portion 201A defines a distance between two energy storage devices 1 arranged adjacently to each other in the X axis direction. That is, the support portion 201A ensures gaps which serve as the passages 203 between two energy storage devices 1 arranged adjacently to each other in the X axis direction.

The support portions 201A extend in the Y axis direction and support the case 10 of the energy storage device 1 over the approximately whole length in the Y axis direction. The length of the support portion 201A in the X axis direction is set according to the size (the width in the X axis direction) of the passage 203 formed between two energy storage devices 1 arranged adjacently to each other.

The base 20A of the inner spacer 2A includes: the connecting portion 202A which connects two support portions 201A arranged adjacently to each other in the Z axis direction and is connected to one ends of the two support potions 201A in the X axis direction; and the connecting portion 202A which connects two support portions 201A arranged adjacently to each other in the Z axis direction and is connected to the other ends of the two support potions 201A in the X axis direction. That is, the base 20A of the inner spacer 2A includes: the connecting portion 202A which is closer to one side in the X axis direction with respect to the center position in the X axis direction of the base 20A; and the connecting portion 202A which is closer to the other side in the X axis direction with respect to the center position in the X axis direction of the base 20A.

In this embodiment, one support portion 201A out of two support portions 201A connected to the connecting portion 202A which is closer to the one side in the X axis direction, and one support portion 201A out of two support portions 201A connected to the connecting portion 202A which is closer to the other side in the X axis direction are identical. With such a configuration, the base 20A of the inner spacer 2A is formed into a rectangular corrugated shape as viewed in the Y axis direction. That is, in the base 20A of the inner spacer 2A, a passage forming portion 204A which forms a groove that opens toward one side in the X axis direction and a passage forming portion 204A which forms a groove that opens toward the other side in the X axis direction are arranged alternately in the Z axis direction.

In the passage forming portion 204A, an opening portion of the groove is closed by the case 10 of the energy storage device 1 arranged adjacently to the passage forming portion 204A on one side in the X axis direction thus forming the passage 203 which is closer to one side in the X axis direction and allows cooling air for cooling the energy storage device 1 to flow therethrough. Further, in the passage forming portion 204A, an opening portion of the groove is closed by the case 10 of the energy storage device 1 arranged adjacently to the passage forming portion 204A on the other side in the X axis direction thus forming the passage 203 which is closer to the other side in the X axis direction and allows cooling air for cooling the energy storage device 1 to flow therethrough.

The blocking portion 21A is configured to constrain the case 10 of the energy storage device 1 arranged along the base 20A. In this embodiment, the blocking portion 21A is configured to partially constrain the case 10 of the energy storage device 1.

The configuration is described specifically. In this embodiment, the energy storage devices 1 are arranged in a state where the first wall 100c of the case 10 is directed in the X axis direction. Along with such an arrangement, the energy storage devices 1 are arranged in a state where the first wall 100c of the case 10 follows the bases 20A. The bases 20A, 20A are formed corresponding to a projection shape of the case 10 of the energy storage device 1 in the X axis direction. Along with such formation of the bases 20A, 20B, the blocking portion 21A is configured to constrain the peripheries of the first walls 100c of the cases 10 arranged adjacently to each other.

In this embodiment, the blocking portion 21A is provided along the four corner portions of the base 20A. That is, the base 20A is provided with the blocking portion 21A at the first corner portion, the second corner portion, the third corner portion and the fourth corner portion.

Each blocking portion 21A includes: a first blocking member 216A which is connected to an outer edge of the base 20A extending in the Z axis direction and extends in the X axis direction from the base 20A; and a second blocking member 217A which is connected to an outer edge of the base 20A extending in the Y axis direction and extends in the X axis direction from the base 20A.

To be more specific, a first blocking portion 210A formed on the first corner portion includes: a first blocking member 216A extending from the third end of the base 20A; and a second blocking member 217A extending from the first end of the base 20A. A second blocking portion 211A formed on the second corner portion includes: a first blocking member 216A extending from the fourth end of the base 20A; and a second blocking member 217A extending from the first end of the base 20A. A third blocking portion 212A formed on the third corner portion includes: a first blocking member 216A extending from the third end of the base 20A; and a second blocking member 217A extending from the second end of the base 20A. A fourth blocking portion 213A formed on the fourth corner portion includes: a first blocking member 216A extending from the fourth end of the base 20A; and a second blocking member 217A extending from the second end of the base 20A.

The first blocking member 216A and the second blocking member 217A which form each blocking portion 21A are connected to each other and make an approximately right angle therebetween. With such a configuration, the four blocking portions 21A cover four corners of the case 10 of the energy storage device 1, and constrain the energy storage device 1. That is, the spacer 2A includes the blocking portions 21A at the four corner portions of the base 20A thus blocking the movement of the energy storage devices 1 arranged adjacently to each other in the Y axis direction as well as in the Z axis direction. To be more specific, the first blocking member 216A restricts the movement of the energy storage device 1 in the Y axis direction, and the second blocking member 217A restricts the movement of the energy storage device 1 in the Z axis direction.

In this embodiment, cooling air is allowed to flow through the passages 203 for cooling the energy storage device 1. The first blocking member 216A functions as a passage blocking portion for blocking leakage of cooling air to the outside.

Figure 7A:
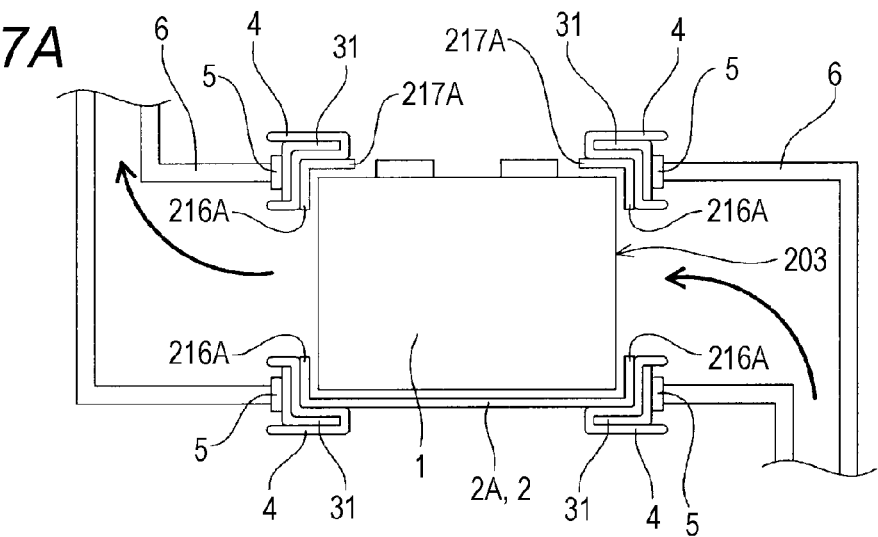
FIG. 7A is a conceptual view describing a state where a cooling duct is mounted on the energy storage apparatus.

The flow of cooling air in this embodiment is described. As shown in FIG. 7A, a cooling duct 6 is mounted on the energy storage apparatus. An air intake fan (not shown in the figure) which makes cooling air flow through the passage 203 is provided. Arrows in FIG. 7A indicate the flow of cooling air.

Figure 7B:
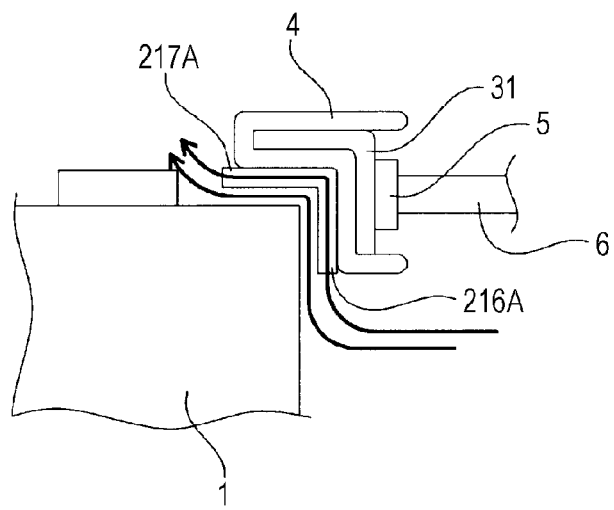
FIG. 7B is a conceptual view describing the flow of cooling air in a conventional energy storage apparatus.
Figure 7C:
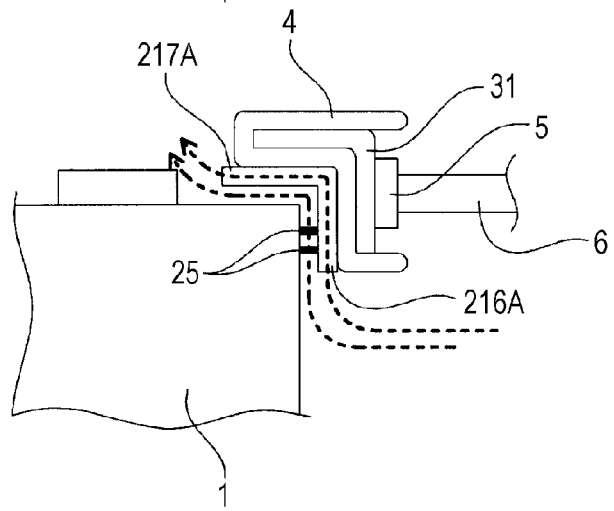
FIG. 7C is a conceptual view describing the flow of cooling air in this embodiment.

FIG. 7B shows the flow of cooling air in a gap formed between inner spacers 2A and a gap formed between the inner spacer 2A and an energy storage device 1 in a conventional energy storage apparatus. FIG. 7C shows the flow of cooling air in a gap formed between the inner spacers 2A and a gap formed between the inner spacer 2A and the energy storage device 1 in this embodiment. In FIG. 7B, the flow of cooling air is indicated by arrows of solid lines. In FIG. 7C, the flow of cooling air is indicated by arrows of broken lines. FIG. 7C expresses that the flow of cooling air in the gap is suppressed compared to the flow of cooling air in the gap in FIG. 7B. In FIG. 8 to FIG. 11, the flow of cooling air in the above-mentioned gap as viewed in the second direction is indicated by arrows.

Out of the inner spacers 2A arranged adjacently to each other with the energy storage device 1 sandwiched therebetween, the first blocking member 216A of one inner spacer 2A has a projection 214A which projects toward the blocking portion 21A of the other inner spacer 2A. The blocking portion 21A of the other inner spacer 2A has a recess 215A which corresponds to the projection 214A. The projection 214A and the recess 215A are configured to be engaged with each other by fitting engagement with a gap formed therebetween.

The configuration is described specifically. As shown in FIG. 8, out of the inner spacers 2A arranged adjacently to each other with the energy storage device 1 sandwiched therebetween, the projection 214A of one first blocking member 216A of one inner spacer 2A projects toward the other inner spacer 2A in the X axis direction. The recess 215A of the other first blocking member 216A is recessed in the direction opposite to the direction that the projection of one first blocking member 216A projects and hence, the projection 214A is fitted into the recess 215A. With such a configuration, the projection 214A and the recess 215A are configured to be engaged with each other by fitting engagement.

The projection 214A and the recess 215A are configured to be engaged with each other by fitting engagement with a gap formed therebetween. That is, a gap is formed between an edge of the projection 214A on a projecting side and an edge of the recess 215A on a recessed side.

The projection 214A in this embodiment is formed into an approximately trapezoidal shape. The recess 215A is formed so as to be recessed in an approximately trapezoidal shape corresponding to the approximately trapezoidal shape of the projection 214A.

The vent cover portion 22A is formed on the first end of the base 20A of the inner spacer 2A. The configuration is described more specifically. The vent cover portion 22A is connected to a center portion of the first end of the base 20A of the inner spacer 2A, and extends toward the energy storage device 1 which is arranged adjacently to the first surface of the base 20A of the inner spacer 2A, and toward another energy storage device 1 which is arranged adjacently to the second surface of the base 20A of the inner spacer 2A. Accordingly, in the energy storage apparatus, the vent cover portions 22A of the respective inner spacers 2A which are arranged adjacently to each other with the energy storage device 1 interposed therebetween cover a gas release vent 101a of the energy storage device 1 in cooperation.

The energy storage apparatus according to this embodiment includes the plurality of energy storage devices 1 as described above and hence, the inner spacer 2A is arranged between every adjacent energy storage devices 1. That is, the energy storage apparatus includes the plurality of inner spacers 2A.

Next, the outer spacer 2B is described. The outer spacer 2B includes: a base 20B having a first surface which faces the energy storage device 1 (the first wall 100c of the case body 100) and a second surface which is disposed on a side opposite to the first surface (hereinafter referred to as "base 20B"); and blocking portions 21B which define the position of the energy storage device 1 arranged adjacently to the base 20B (hereinafter referred to as "blocking portions 21B").

Further, in the outer spacer 2B in this embodiment, the base 20B and an end plate 30 described later of the holder 3 face each other in an opposed manner. That is, the outer spacer 2B is arranged between the energy storage device 1 and the end plate 30. With such a configuration, the outer spacer 2B has a fitting portion 22B which engages with the end plate 30 by fitting engagement at a position which faces the end plate 30 of the base 20B in an opposed manner. That is, the outer spacer 2B has the fitting portion 22B which is provided for defining the position of the end plate 30 with respect to the base 20B and is formed on the second surface of the base 20B. Further, the outer spacer 2B includes shaft portions 23B which are provided for defining the position of the end plate 30 with respect to the base 20B and project from the second surface of the base 20B.

The outer spacer 2B has outer contact portions 24B which project toward the end plate 30 from the second surface of the base 20B and are brought into contact with the end plate 30. In the embodiment, the outer spacer 2B includes support portions 201B which project toward the energy storage device 1 from the first surface of the base 20B and are brought into contact with the energy storage device 1.

The base 20B of the outer spacer 2B extends in the Y axis direction and the Z axis direction which are orthogonal to the X axis direction. That is, the base 20B is formed in a plate shape. The base 20B of the outer spacer 2B has: a first end arranged at the position corresponding to the lid plate 101 of the energy storage device 1; and a second end disposed on a side opposite to the first end and arranged at the position corresponding to the closing portion 100a of the energy storage device 1. The base 20B of the outer spacer 2B also has a third end arranged at the position corresponding to one second wall 100d of the energy storage device 1; and a fourth end disposed on a side opposite to the third end and arranged at the position corresponding to the other second wall 100d of the energy storage device 1.

The base 20B of the outer spacer 2B has: a first corner portion where the first end and the third end are connected to each other; and a second corner portion where the first end and the fourth end are connected to each other. The base 20B of the outer spacer 2B also has: a third corner portion where the second end and the third end are connected to each other; and a fourth corner portion where the second end and the fourth end are connected to each other.

The first end and the second end of the base 20B of the outer spacer 2B extend in the Y axis direction. The third end and the fourth end of the base 20B of the outer spacer 2B extend in the Z axis direction. Accordingly, the base 20B of the outer spacer 2B has an approximately rectangular shape. The base 20B of the outer spacer 2B has a size substantially equal to the size of the first wall 100c of the energy storage device 1.

In the energy storage apparatus according to this embodiment, passages 203 which allow a fluid to pass through a gap between the first surface of the base 20B of the outer spacer 2B and the energy storage device 1 are formed between the first surface of the base 20B and the energy storage device 1.

That is, the base 20B of the outer spacer 2B is configured to form the passages 203 through which cooling air for cooling the energy storage device 1 arranged adjacently to the outer spacer 2B flows together with the energy storage device 1. The configuration of the outer spacer 2B on an energy storage device 1 side is basically in common with the configuration of the base 20A of the inner spacer 2A. Hereinafter, the description is made with respect to the configuration of the outer spacer 2B which differs from the configuration of the inner spacer 2A.

The support portions 201B define a distance between the outer spacer 2B and the energy storage device 1 arranged adjacently to each other in the X axis direction. That is, the support portions 201B ensure gaps which serve as the passages 203 between the outer spacer 2B and the energy storage device 1 arranged adjacently to each other in the X axis direction. The length of the support portion 201B in the X axis direction is set according to the size (the width in the X axis direction) of the passage 203 formed between the outer spacer 2B and the energy storage device 1 arranged adjacently to each other.

The base 20B of the outer spacer 2B includes: connecting portions 202B each of which connects two support portions 201B arranged adjacently to each other in the Z axis direction and is connected to one ends of the two support potions 201B on a base 20B side in the X axis direction. That is, the base 20B of the outer spacer 2B includes: the connecting portions 202B which are arranged along the Z axis direction.

In this embodiment, each of the support portions 201B is connected to two connecting portions 202B arranged adjacently to each other in the Z axis direction. That is, every two connecting portions 202B arranged adjacently to each other in the Z axis direction share one support portion 201B in common. With such a configuration, on the base 20B of the outer spacer 2B, a passage forming portion 204B which forms a groove that opens toward the energy storage device 1 side in the X axis direction is arranged.

In the passage forming portion 204B, an opening portion of the groove is closed by the case 10 of the energy storage device 1 arranged adjacently to the outer spacer 2B thus forming the passage 203 which allows cooling air for cooling the energy storage device 1 to flow therethrough.

The blocking portion 21B is configured to constrain the case 10 of the energy storage device 1 arranged along the base 20B. In this embodiment, the blocking portion 21B is configured to partially constrain the case 10 of the energy storage device 1.

The configuration is described specifically. In this embodiment, the energy storage device 1 is arranged in a state where the first wall 100c of the case 10 is directed in the X axis direction. Along with such an arrangement, the energy storage device 1 is arranged in a state where the first wall 100c of the case 10 follows the base 20B. Along with such an arrangement, the blocking portions 21B are configured to constrain the periphery of the first wall 100c of the case 10 arranged adjacently to the outer spacer 2B.

In this embodiment, the blocking portions 21B are provided to the four corner portions of the base 20B. That is, the outer spacer 2B is provided with the blocking portion 21B at the first corner portion, the second corner portion, the third corner portion and the fourth corner portion of the base 20B.

Each blocking portion 21B includes: a first blocking member 216B which is connected to an outer edge of the base 20B extending in the Z axis direction and extends in the X axis direction from the base 20B; and a second blocking member 217B which is connected to an outer edge of the base 20B extending in the Y axis direction and extends in the X axis direction from the base 20B.

To be more specific, a first blocking portion 210B formed on the first corner portion includes: a first blocking member 216B extending from the third end of the base 20B; and a second blocking member 217B extending from the first end of the base 20B. A second blocking portion 211B formed on the second corner portion includes: a first blocking member 216B extending from the fourth end of the base 20B; and a second blocking member 217B extending from the first end of the base 20B. A third blocking portion 212B formed on the third corner portion includes: a first blocking member 216B extending from the third end of the base 20B; and a second blocking member 217B extending from the second end of the base 20B. A fourth blocking portion 213B formed on the fourth corner portion includes: a first blocking member 216B extending from the fourth end of the base 20B; and a second blocking member 217B extending from the second end of the base 20B.

The first blocking member 216B and the second blocking member 217B which form each blocking portion 21B are connected to each other and make an approximately right angle therebetween. With such a configuration, the respective blocking portions 21B cover four corners of the case 10 of the energy storage device 1, and constrain the energy storage device 1. That is, the spacer 2B includes the blocking portions 21B at the four corner portions of the base 20B thus blocking the movement in the Y axis direction as well as in the Z axis direction of the energy storage device 1 arranged adjacently to the outer spacer 2B. To be more specific, the first blocking member 216B restricts the movement of the energy storage device 1 in the Y axis direction, and the second blocking member 217B restricts the movement of the energy storage device 1 in the Z axis direction.

In this embodiment, cooling air is allowed to flow through the passages 203 for cooling the energy storage device 1. The first blocking member 216B functions as a passage blocking portion for blocking leakage of cooling air to the outside.

The outer spacer 2B is arranged adjacently to the inner spacer 2A with the energy storage device 1 sandwiched therebetween. The first blocking member 216B of the outer spacer 2B has a projection 214B which projects toward the blocking portion 21A of the inner spacer 2A which is arranged adjacently to the outer spacer 2B with the energy storage device 1 sandwiched therebetween. Further, the blocking portion 21A of the inner spacer 2A has the recess 215A corresponding to the projection 214B. The projection 214B and the recess 215A are configured to be engaged with each other by fitting engagement with a gap formed therebetween.

The projection 214B in this embodiment is formed into an approximately trapezoidal shape. That is, the projection 214B is formed such that the length of the projection 214B in the Z axis direction is gradually shortened toward a bottom portion of the corresponding recess 215A. With such a configuration, the recess 215A is formed such that the length of the recess 215A in the Z axis direction is gradually shortened toward the bottom portion thereof.

Out of the pair of outer spacers 2B in this embodiment, four first blocking members 216B of one outer spacer 2B each have the projection 214B, and four first blocking members 216B of the other outer spacer 2B each have the recess 215B.

The projection 214B and the recess 215A in this embodiment are formed such that the distance between the projection 214B and the recess 215A in the X axis direction is the largest in a state where the projection 214B and the recess 215A are engaged with each other by fitting engagement. That is, distances between the projection 214B and the recess 215A in the directions other than the X axis direction are set partially shorter than the distance in the X axis direction. Accordingly, a relatively narrow portion is formed between the projection 214B and the recess 215A.

The fitting portion 22B has an extending portion 220B which extends toward the holder 3 (the end plate 30 described later) from the second surface of the base 20B of the outer spacer 2B.

The shaft portions 23B are inserted into insertion holes 300a formed in the end plate 30 described later.

As described above, the outer contact portions 24B project toward the end plate 30 from the base 20B of the outer spacer 2B and are brought into contact with the end plate 30. Accordingly, in the energy storage apparatus, gaps are formed between the outer spacer 2B and the end plate 30.

As described above, the outer spacer 2B in this embodiment is arranged adjacently to the inner spacer with the energy storage device 1 interposed therebetween. That is, the energy storage apparatus includes the pair of outer spacers 2B. The outer spacers 2B are arranged adjacently to the energy storage devices 1 disposed at the outermost ends among the plurality of energy storage devices 1. That is, the pair of outer spacers 2B is provided so as to sandwich the plurality of energy storage devices 1 arranged in a row.

As described above, each of the pair of outer spacers 2B has the first surface thereof facing the case body 100 of the energy storage device 1 in an opposed manner. Accordingly, the pair of outer spacers 2B is arranged such that the first surfaces of the bases 20B of the outer spacers 2B are directed to each other. With such a configuration, in the energy storage apparatus, the pair of outer spacers 2B is arranged in symmetry with respect to the direction along which the plurality of energy storage devices 1 are arranged in a row (hereinafter, referred to as the X axis direction).

In this embodiment, the holder 3 is made of metal. As shown in FIG. 4, the holder 3 includes the pair of end plates 30 which is arranged at positions adjacently to the respective outer spacers 2B, and frames 31 which connect the pair of end plates 30 to each other.

Each of the pair of end plates 30 includes a first surface which faces the outer spacer 2B in an opposed manner; and a second surface disposed on a side opposite to the first surface. Each of the pair of end plates 30 has a pressure contact portion 300 which is brought into pressure contact with the outer contact portion 24B extending from the base 20B of the outer spacer 2B.

The end plate 30 has: a first end arranged at the position corresponding to the lid plate 101 of the energy storage device 1; and a second end disposed on a side opposite to the first end (the second end arranged at the position corresponding to the closing portion 100a of the energy storage device 1). The end plate 30 also has: a third end arranged at the position corresponding to one second wall 100d of the energy storage device 1; and a fourth end disposed on a side opposite to the third end (the fourth end arranged at the position corresponding to the other second wall 100d of the energy storage device 1).

The pressure contact portion 300 has the insertion holes 300a formed at positions corresponding to shaft portions 23B of the outer spacer 2B. The pressure contact portion 300 also has a plurality of (four in this embodiment) through holes 300b which are formed in the corner portions.

The insulator 4 is formed using a material having an insulating property. The insulator 4 includes: a pair of first insulating portions 40 arranged between the pair of first connecting portions 310 and the spacers 2 (the inner spacers 2A and the outer spacers 2B); and a pair of second insulating portions 41 arranged between the pair of second connecting portions 311 and the spacers 2 (the inner spacers 2A and the outer spacers 2B).

Hereinafter, an energy storage apparatus according to another embodiment of the present invention is described by reference to attached drawings. In this embodiment, constitutional elements substantially equal to the constitutional parts of the above-mentioned embodiment are given the same symbols and will not be described repeatedly, and the description of the above-mentioned embodiment should be referred to.

In this embodiment, each inner spacer 2A includes projecting portions 25 which project in the Y axis direction toward an energy storage device 1 from a surface of a first blocking member 216A which faces the energy storage device 1 in an opposed manner and are brought into contact with a barrel portion 100b of the energy storage device 1.

The projecting portion 25 of one inner spacer 2A and the projecting portion 25 of the other inner spacer 2A which is arranged adjacently to the one spacer 2A with the energy storage device 1 sandwiched therebetween are arranged so as to partially face each other in an opposed manner in the third direction. Hereinafter, the projecting portion 25 of one inner spacer 2A is referred to as one projecting portion 25, and the projecting portion 25 of the other inner spacer 2A which is arranged adjacently to the one spacer 2A with the energy storage device 1 sandwiched therebetween is referred to as the other projecting portion 25.

Figure 9:
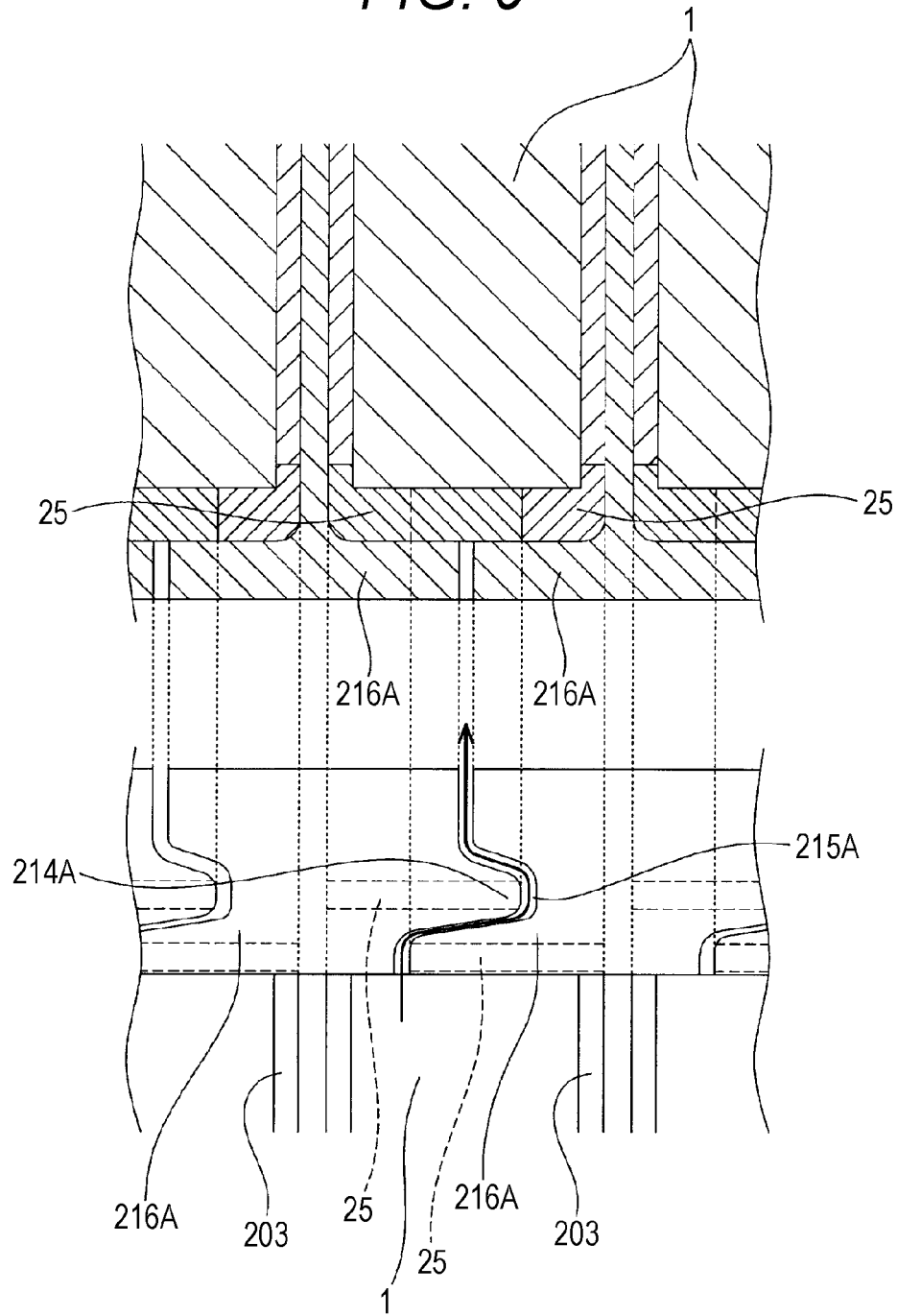
FIG. 9 is a cross-sectional view of a part of the energy storage apparatus according to the embodiment describing a state where the spacers are arranged with the energy storage device sandwiched therebetween.

To be more specific, as shown in FIG. 9, out of the inner spacers 2A arranged adjacently to each other, one projecting portion 25 projects toward an energy storage device 1 side in the Y axis direction from a position of the first blocking member 216A corresponding to a projection 214A. Further, the other projecting portion 25 projects toward an energy storage device 1 side in the Y axis direction from a position of the first blocking member 216A corresponding to one member out of two members arranged on both sides of a recess 215A. The respective projecting portions 25 are brought into contact with a barrel portion 100b of the energy storage device 1 ranging from a first wall 100c to a second wall 100d. Accordingly, the projecting portion 25 is formed by connecting two plate-like members each having an approximately rectangular shape in a bent manner in conformity with the shape of the case 10.

That is, one projecting portion 25 extends over the whole length of the first blocking member 216A in the X axis direction, and is disposed at a position passing the projection 214A. The other projecting portion 25 extends over the whole length of the first blocking member 216A in the X axis direction, and is disposed at a position avoiding the recess 215A in the Z axis direction.

One projecting portion 25 and the other projecting portion 25 are arranged such that a portion of the one projecting portion 25 covers a portion of the other projecting portion 25. In this embodiment, one projecting portion 25 which extends over the whole length of the first blocking member 216A in the X axis direction and is arranged at a position passing the projection 214A is arranged to cover the other projecting portion 25. A gap extending in the X axis direction is formed between one projecting portion 25 and the other projecting portion 25.

As has been described heretofore, the energy storage apparatus according to this embodiment includes: at least one energy storage device 1; and at least two spacers 2 which sandwich the energy storage device 1 therebetween, wherein each of the spacers 2 includes: the passage forming portion 204A that forms the passages 203 through which cooling air is allowed to flow in the second direction orthogonal to the first direction along which the energy storage device 1 and the spacers 2 are arranged in a row; and the first blocking member 216A which is provided at least one end of the spacer 2 in the second direction. With respect to the spacers 2 arranged adjacently to each other with the energy storage device 1 sandwiched therebetween, the first blocking member 216A of one spacer 2 and the first blocking member 216A of the other spacer 2 are arranged so as to partially overlap with each other as viewed in the third direction orthogonal to the first direction and the second direction.

With such a configuration, the first blocking member 216A of the one spacer 2 and the first blocking member 216A of the other spacer 2 overlap with each other in the third direction. The length of the overlapping portion in the third direction is elongated compared to a case where the lengths (heights) of the first blocking members 216A in the third direction are equal and the overlapping portion extends straightly in the third direction (a case where the length of the overlapping portion becomes the shortest distance in the third direction). Therefore, when cooling air flows through the overlapping portion, resistance is increased and hence, a pressure loss of cooling air is increased. Accordingly, it is difficult for cooling air to pass through the overlapping portion. As a result, when a gap is formed in the overlapping portion in a state where the energy storage devices 1 are assembled or when a gap is formed in the overlapping portion due to the expansion attributed to charging of the energy storage device 1, the reduction of the amount of cooling air which contributes to the cooling of the energy storage device 1 can be prevented. Further, the distance along which cooling air flows can be elongated without changing the length (height) of the first blocking member 216A in the third direction. Accordingly, lowering of cooling efficiency by cooling air can be suppressed without increasing the size of the first blocking member 216A.

In this case, the spacer 2 may include at least one projecting portion 25 which projects in the second direction from the passage blocking portion and is brought into contact with the energy storage device 1 which faces the passage blocking portion in an opposed manner.

With such a configuration, the projecting portion 25 which projects in the second direction partially closes a gap formed between the energy storage device 1 and the passage blocking portion. Accordingly, it is possible to prevent cooling air from flowing between the energy storage device 1 and the passage blocking portion.

In this case, the projecting portion 25 of the first blocking member 216A of the one spacer 2 and the projecting portion 25 of the first blocking member 216A of the other spacer 2 may be arranged so as to partially overlap with each other as viewed in the third direction.

With such a configuration, when a gap is formed between the projecting portion 25 and another projecting portion 25 which face each other in an opposed manner, the gap is formed in a penetrating manner in the third direction while having a roundabout portion at the middle. Cooling air which flows into the gap between the first blocking member 216A and the energy storage device 1 impinges on the projecting portion 25 at the roundabout portion of the gap. When cooling air impinges on the projecting portion 25, a pressure loss is generated. Further, when the gap has the roundabout portion at the middle in the third direction, a distance along which cooling air flows is elongated. Accordingly, resistance is increased and a pressure loss of cooling air is increased. Therefore, it becomes difficult for cooling air to flow through the gap formed between the first blocking member 216A and the energy storage device 1. As a result, the reduction of cooling air which contributes to cooling of the energy storage device 1 can be prevented. Accordingly, lowering of cooling efficiency by cooling air can be suppressed.

In this case, the first blocking member 216A of the one spacer 2 may include the projection 214A which projects toward the first blocking member 216A of the other spacer 2, and the first blocking member 216A of the other spacer 2 may include a recess 215A corresponding to the projection 214A.

With such a configuration, when a gap is formed between the projection 214A and the recess 215A, the gap is formed in a penetrating manner in the third direction while having a roundabout portion at the middle. Cooling air which flows into the gap impinges on a passage wall at the gap roundabout portion. When cooling air impinges on the passage wall, a pressure loss is generated. That is, when the roundabout portion exists in the gap formed between the projection 214A and the recess 215A, resistance is increased and a pressure loss of cooling air is increased. Further, when the gap has the roundabout portion at the middle in the third direction, a distance along which cooling air flows is elongated and hence, a pressure loss can be further increased. Accordingly, also in the case where the gap is formed between the projection 214A and the recess 215A, it becomes more difficult for cooling air to flow through the gap. As a result, the reduction of the amount of cooling air which contributes to the cooling of the energy storage device 1 can be prevented. Accordingly, lowering of cooling efficiency by cooling air can be further suppressed.

It is needless to say that the energy storage apparatus according to the present invention is not limited to the above-mentioned embodiments, and various modifications are conceivable without departing from the gist of the present invention.

In the energy storage apparatus of the above-mentioned embodiments, although the gap extending in the third direction is formed between the spacers 2 arranged adjacently to each other in a state where the energy storage devices 1 are assembled to each other, the energy storage apparatus is not limited to the above-mentioned configuration. The configuration where the spacers 2 arranged adjacently to each other are arranged so as to partially overlap with each other as viewed in the third direction is effective also in a case where a gap is formed between the spacers 2 arranged adjacently to each other due to the expansion of the energy storage device 1 due to charging. That is, the above-mentioned configuration is effective also in a case where although the spacers 2 arranged adjacently to each other are brought into close contact with each other before charging, a gap is formed between the spacers 2 arranged adjacently to each other due to the expansion of the energy storage device 1 due to charging.

Figure 10:
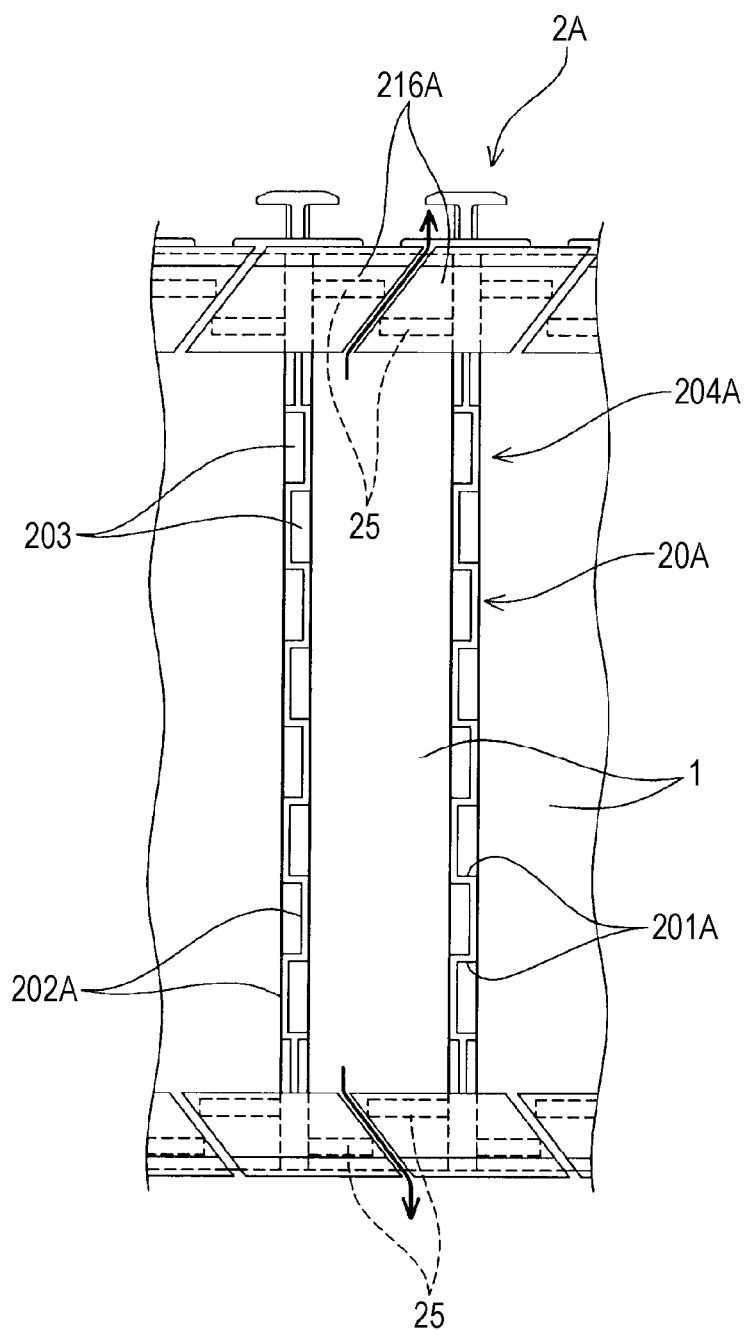
FIG. 10 is a side view of a part of an energy storage apparatus according to another embodiment describing a state where spacers are arranged with an energy storage device sandwiched therebetween.

In the above-mentioned embodiments, the description is made with respect to the case where the first blocking members 216A, 216B have the projections 214A, 214B or the recesses 215A, 215B, respectively. However, the present invention is not limited to such a configuration. As shown in FIG. 10, the first blocking members 216A, 216B may not include the projections 214A, 214B or the recesses 215A, 215B, and the overlapping portion of the first blocking members may have a straight line shape. Further, it is preferable that a plurality of projecting portions 25 be formed in a projecting manner toward the energy storage device 1 from the first blocking members (passage blocking portions) 216A, 216B, and the projecting portions 25 be arranged so as to partially overlap with each other as viewed in the third direction.

In the above-mentioned embodiments, each first blocking member 216A has one projection 214A or one recess 215A. However, the present invention is not limited to the configuration where each first blocking member 216A has one projection 214A or one recess 215A. Each first blocking member 216A may include a plurality of projections 214A or a plurality of recesses 215A. With such a configuration, the number of roundabout portions in the gap formed between the projection 214A and the recess 215A is increased and hence, resistance is further increased so that it becomes difficult for cooling air to pass through the gap.

Figure 11:
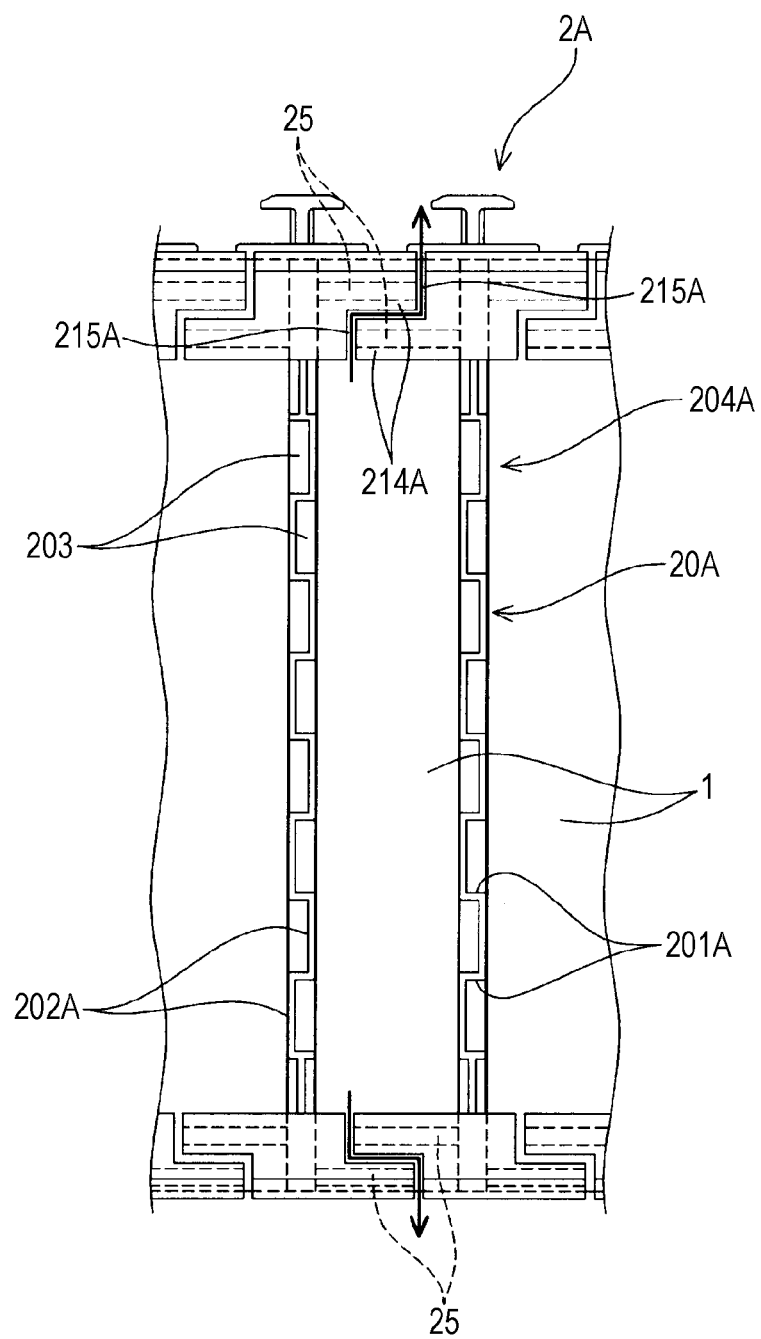
FIG. 11 is a side view of a part of an energy storage apparatus according to still another embodiment describing a state where spacers are arranged with an energy storage device sandwiched therebetween.
Figure 12:
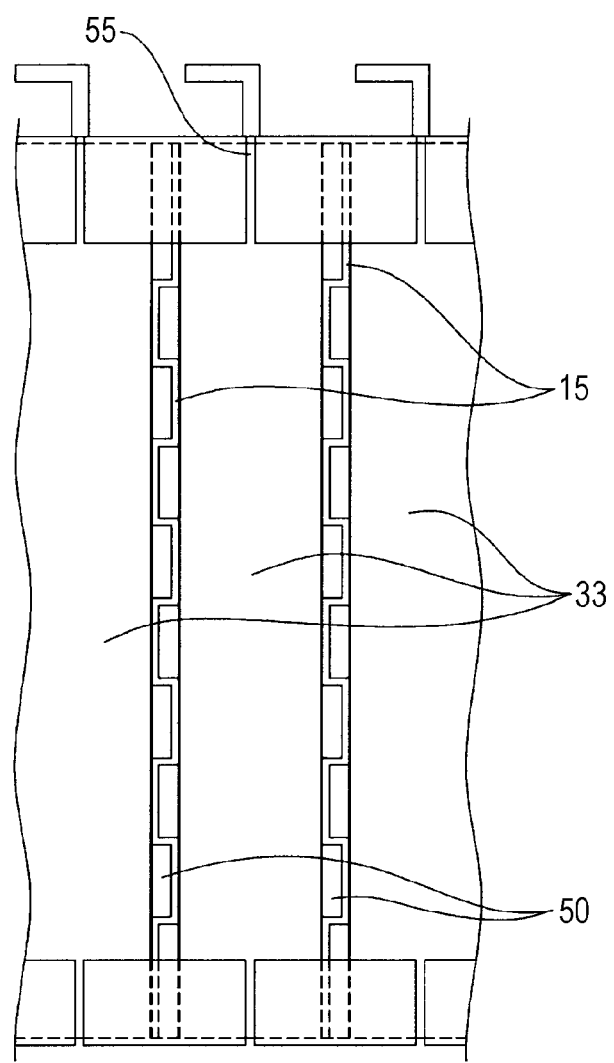
FIG. 12 is a side view of a part of a conventional energy storage apparatus describing a state where spacers are arranged with an energy storage device sandwiched therebetween.

In the above-mentioned embodiments, the projection 214A or the recess 215A is formed into an approximately trapezoidal shape. However, the shapes of the projection 214A and the recess 215A are not limited to the approximately trapezoidal shape. The projection 214A may be formed into an S shape, a stepped shape (shown in FIG. 11), or a rectangular shape. In such a configuration, the recess 215A may have a shape corresponding to the projection 214A. In this case, for example, as shown in FIG. 11, it is preferable that a plurality of projecting portions 25 be formed in a projecting manner toward the energy storage device 1 from the first blocking members (passage blocking portions) 216A, and the projecting portions 25 be arranged so as to partially overlap with each other as viewed in the third direction.

In the above-mentioned embodiment, the description is made with respect to the case where the projecting portion 25 projects toward an energy storage device 1 side in the Y axis direction from a position of the first blocking member 216A corresponding to the projection 214A or a position of the first blocking members 216A corresponding to one member out of two members arranged on both sides of the recess 215A. However, the present invention is not limited to such a configuration. That is, provided that the projecting portions 25 are arranged so as to partially overlap with each other as viewed in the third direction, regardless of the arrangement of the projection 214A and the recess 215A of the first blocking members 216A, the projecting portion 25 may project in the X axis direction from an outer edge of the first blocking member 216A in the X axis direction when the first blocking member 216A is viewed in the Y axis direction.

In the above-mentioned embodiment, the description is made with respect to the case where the inner spacer 2A includes the projecting portion 25. However, the outer spacer 2B may include the projecting portion 25. Further, in this case, it is preferable that the projecting portion 25 of the inner spacer 2A and the projecting portion 25 of the outer spacer 2B be arranged so as to partially overlap with each other as viewed in the third direction.

In the above-mentioned embodiment, the inner spacer 2A includes one projecting portion 25. However, the present invention is not limited to the configuration where the inner spacer 2A has one projecting portion 25. The inner spacer 2A may include a plurality of projecting portions 25. With such a configuration, resistance is further increased so that it becomes difficult for cooling air to pass through between the inner spacer 2A and the energy storage device 1.

In the above-mentioned embodiment, out of the inner spacers 2A which are arranged adjacently to each other with the energy storage device sandwiched therebetween, the projecting portion 25 of one inner spacer 2A and the projecting portion 25 of the other inner spacer 2A are arranged so as to partially face each other in an opposed manner in the third direction. However, these projecting portions 25 may not face each other in an opposed manner. In this case, these projecting portions 25 may be arranged at the same height in the Z axis direction or may be arranged at different heights in the Z axis direction.

In the above-mentioned embodiments, the first blocking members 216A, 216B are formed along four corner portions of the bases 20A, 20B, respectively. However, the present invention is not limited to such a configuration. Each of the first blocking members 216A, 216B may be formed on two corner portions of the spacer 2 at least on one end of the spacer 2 in the Y axis direction, the one end on an inlet side of the passage 203.

Although the above-mentioned embodiments have the configuration where cooling air is allowed to flow in the passage 203 using an air intake fan, the present invention is not limited to such a configuration. The present invention may adopt the configuration where an air exhaust fan is used instead of the air intake fan, and cooling air is allowed to flow through the passage 203 by making use of a force to discharge a fluid. In the case where the air exhaust fan is used, there is a possibility that a fluid which does not contribute to cooling of the energy storage device 1 (fluid which does not pass through the passage 203) is generated through a gap formed between the spacers 2 arranged adjacently to each other or a gap formed between the spacer 2 and the energy storage device 1. However, a pressure loss of a fluid which flows in the gap formed between the spacers 2 arranged adjacently to each other or the gap formed between the spacer 2 and the energy storage device 1 is increased. Accordingly, the reduction of the amount of cooling air which contributes to cooling of the energy storage device 1 can be prevented.

FIG. 8 to FIG. 11 show the case where the gap is formed between the spacers arranged adjacently to each other in a state where the energy storage devices 1 are assembled to each other. However, the present invention is not limited to such a configuration. The spacers arranged adjacently to each other may be brought into close contact with each other in the state where the energy storage devices 1 are assembled to each other.

In the above-mentioned embodiments, the base 20A of the inner spacer 2A has an approximately rectangular shape, and has a size substantially equal to the size of the first wall 100c of the energy storage device 1. However, provided that the base 20A of the inner spacer 2A can make postures of two energy storage devices 1 arranged adjacently to the inner spacer 2A correspond to each other, the shape of the base 20A of the inner spacer 2A is not limited to the approximately rectangular shape, and the size of the base 20A of the inner spacer 2A is also not limited to the size substantially equal to the size of the first wall 100c of the energy storage device 1.

In the above-mentioned embodiments, the passages 203 are formed between the base 20A and the energy storage device 1 by forming the base 20A of the inner spacer 2A into a rectangular corrugated shape. However, provided that a fluid is allowed to pass through between the first surface and the energy storage device 1 (between the second surface and the energy storage device 2), the shape of the base 20A of the inner spacer 2A is not limited to the rectangular corrugated shape. Further, when it is unnecessary to form the passages 203 between the base 20A of the inner spacer 2A and the energy storage device 1, the base 20A of the inner spacer 2A may be formed into a flat plate shape.

In the above-mentioned embodiments, the blocking portions 21A of the inner spacer 2A are formed at the respective corner portions of the base 20A. However, provided that the blocking portions 21A of the inner spacer 2A can define the position of the energy storage device 1 with respect to the base 20A, the positions where the blocking portions 21A of the inner spacer 2A are formed on the base 20A are not limited.

In the above-mentioned embodiments, the base 20B of the outer spacer 2B has an approximately rectangular shape, and has a size substantially equal to the size of the first wall 100c of the energy storage device 1. However, provided that the base 20B can make the postures of the energy storage device 1 and the end plate 30 arranged adjacently to each other correspond to each other, the shape of the base 20B is not limited to the approximately rectangular shape, and the size of the base 20B is also not limited to the size substantially equal to the size of the first wall 100c of the energy storage device 1.

In the above-mentioned embodiments, the blocking portions 21B of the outer spacer 2B are formed at the respective corner portions of the base 20B. However, provided that the blocking portions 21B of the outer spacer 2B can define the position of the energy storage device 1 with respect to the base 20B, the positions where the blocking portions 21B of the outer spacer 2B are formed on the base 20B are not limited.

Conventionally, there has been known a battery module for vehicles which includes a prismatic-shaped battery cell (see JP-A-2012-256465). To be more specific, the battery module includes: a plurality of battery cells which are arranged in a row in a predetermined direction (first direction); and holders each of which is arranged between the battery cells arranged in a row.

The holder has a body portion which extends in the direction orthogonal to the first direction, and engaging portions which project from the body portion toward both sides in the first direction and are engaged with lower end portions of the battery cells arranged adjacently to the body portion.

The engaging portions include, on both sides of the body portion in the first direction: a pair of fourth engaging portions which extends from the body portion along lower end portions of side surfaces of the battery cells; and a pair of load transmission portions which extends from the body portion at both end portions in the width direction of a bottom surface of the battery cell. The fourth engaging portion and the load transmission portion at each corner portion of the lower end of the battery cell are brought into contact with corresponding side surface side and bottom surface side of the corner portion, respectively. With such a configuration, each holder is engaged with the lower end potions of the battery cells which are arranged adjacently to the holder and hence, the battery module can acquire predetermined rigidity and, as a result, the battery module having high vibration resistance can be obtained.

The battery module is mounted on a vehicle or the like and hence, the battery module is used in a situation where vibrations are liable to be applied to the battery module. Accordingly, recently, there has been a demand for further improvement of vibration resistance of a battery module.

(1) An energy storage apparatus includes:

energy storage devices each having a prismatic shape and arranged in a row in a first direction; and inner spacers each of which is arranged between the energy storage devices, wherein each of the inner spacers includes: a base which extends in directions orthogonal to the first direction, the base being configured such that the energy storage device is arranged on both sides of the base in the first direction; and a blocking portion on one end side, the blocking portion configured to suppress positional displacement of the energy storage device with respect to the base by being brought into contact with one end surface of the energy storage device at one end in a third direction orthogonal to the first direction, the blocking portion extending toward both sides in the first direction from the base, wherein the blocking portion on the one end side includes:

a first opposedly-facing portion having an opposedly-facing surface which faces the one end surface of the energy storage device in an opposed manner;

a pair of second opposedly-facing portions which sandwiches in a second direction orthogonal to the first direction and the third direction an end portion including the one end surface of the energy storage device; and a projecting ridge which projects toward the one end surface of the energy storage device from the opposedly-facing surface and extends in the second direction.

With such a configuration, the inner spacer holds the one end portion at the one end in the third direction of each of the energy storage devices which are arranged adjacently to both sides of the inner spacer in the first direction by the blocking portion on the one end side (that is, the first opposedly-facing portion restricts the positional displacement of the energy storage devices toward the one side in the third direction, and the pair of second opposedly-facing portions restricts the positional displacement in the second direction of the one end portion by sandwiching the one end portion) and hence, the inner spacers and the energy storage devices which are arranged adjacently to each other in the energy storage apparatus are surely engaged with each other so that the rigidity of the energy storage apparatus is increased as a whole. As a result, the vibration resistance of the energy storage apparatus is enhanced.

Further, the projecting ridge is brought into contact with the energy storage device and hence, a contact area between the first opposedly-facing portion and the energy storage device in the first direction can be suppressed whereby the fitting engagement between the inner spacer and the energy storage device in the first direction can be facilitated.

(2) In the energy storage apparatus having the configuration (1), the first opposedly-facing portion and the second opposedly-facing portions may be connected to each other at two corner portions on the end portion of the energy storage device.

With such a configuration, rigidity of the inner spacer per se is increased, and the whole one end portion of the energy storage device is held by the blocking portion on the one end side and hence, the inner spacer and the energy storage device arranged adjacently to each other are further firmly engaged with each other whereby the rigidity of the energy storage apparatus is further increased as a whole.

(3) In the energy storage apparatus having the configuration (1) or (2), it is preferable that the projecting ridge extend continuously from one corner portion out of the two corner portions to the other corner portion.

With such a configuration, it is possible to sufficiently ensure a contact area between the blocking portion on the one end side and the energy storage device in the second direction (direction toward the other corner portion from the one corner portion) while suppressing a contact area between the blocking portion on the one end side and the energy storage device in the first direction and hence, the rigidity of the energy storage apparatus in an assembled state can be increased as a whole while maintaining the easiness of the fitting engagement between the inner spacer and the energy storage device in the first direction at the time of assembling.

(4) In the energy storage apparatus having any one of the configurations (1) to (3), With such a configuration, the positional displacement in the third direction of the energy storage device arranged adjacently to the inner spacer with respect to the inner spacer can be suppressed.

(5) In the energy storage apparatus having the configuration (4), the projecting ridge has a triangular shape in cross section.

With such a configuration, by pushing the energy storage device to the base in a state where the other end portion of the energy storage device is brought into contact with the blocking portion on the other end side and the one end portion of the energy storage device is brought into contact with an inclined surface (inclined side of a triangular cross section) of the projecting ridge, the one end portion is guided to a peak (distal end in the projecting direction) of the projecting ridge along the inclined surface, and the energy storage device is fitted in a gap formed between the projecting ridge and the blocking portion on the other end side. Accordingly, the fitting engagement of the energy storage device and the inner spacer can be easily performed.

(6) In the energy storage apparatus having the configuration (4) or (5), the blocking portion on the other end side may have, on both sides of the base in the first direction, a sandwiching surface which is directed to the opposedly-facing surface of the first opposedly-facing portion in the third direction in an opposed manner and sandwiches the energy storage device together with the first opposedly-facing portion, and the inner spacer may be formed in an elastically deformable manner, and in a state where the energy storage device is not sandwiched between the sandwiching surface and the first opposedly-facing portion, a distance in the third direction from the sandwiching surface to the distal end of the projecting ridge in the projecting direction may be set smaller than the length of the energy storage device in the third direction.

With such a configuration, the distance between the sandwiching surface and the projecting ridge is expanded (the inner spacer is elastically deformed) in a state where the energy storage device is fitted in the inner spacer and hence, the energy storage device is sandwiched between the sandwiching surface and the projecting ridge in the third direction by an elastic restoring force of the inner spacer (force of the spacer to return the spacer to a state before being elastically deformed). Accordingly, the inner spacer and the energy storage device are engaged with each other more firmly and, as a result, the rigidity of the energy storage apparatus is further increased.

(7) In the energy storage apparatus having any one of the configurations (4) to (6), the base may be configured such that, on both sides in the second direction, edges of the base extend to the same positions as the opposedly-facing surfaces of the second opposedly-facing portions facing the energy storage device or to positions outside the opposedly-facing surfaces of the second opposedly-facing portions.

With such a configuration, the rigidity of the base (that is, the rigidity of the inner spacer) is increased compared to the configuration where, on both sides in the second direction, the edges of the base are arranged inside the opposedly-facing surfaces of the second opposedly-facing portions and hence, the rigidity of the energy storage apparatus is also increased as a whole.

(8) In the energy storage apparatus having any one of the configurations (4) to (7), the blocking portion on the other end side may have a pair of third opposedly-facing portions which sandwiches in the second direction the other end portion of the energy storage device in the third direction, and the base may be configured such that, on both sides in the second direction, the edges of the base extend to the same positions as opposedly-facing surfaces of the third opposedly-facing portions facing the energy storage device or to positions outside the opposedly-facing surfaces of the third opposedly-facing portions.

With such a configuration, the rigidity of the base (that is, the rigidity of the inner spacer) is increased compared to the configuration where, on both sides in the second direction, the edges of the base are arranged inside the opposedly-facing surfaces of the third opposedly-facing portions and hence, the rigidity of the energy storage apparatus is also increased as a whole.

(9) In the energy storage apparatus having any one of the configurations (1) to (8), with respect to the inner spacers which are arranged adjacently to each other with the energy storage device sandwiched therebetween, distal ends of the blocking portions on the one end side in the first direction may be brought into contact with each other.

With such a configuration, the whole end surface of the one end portion of the energy storage device is covered with the blocking portions on the one end side of the inner spacers arranged on both sides of the energy storage device and hence, the one end portions of the energy storage devices arranged in a row in the first direction are minimally short-circuited. That is, the insulating property is enhanced.

Figure 13:
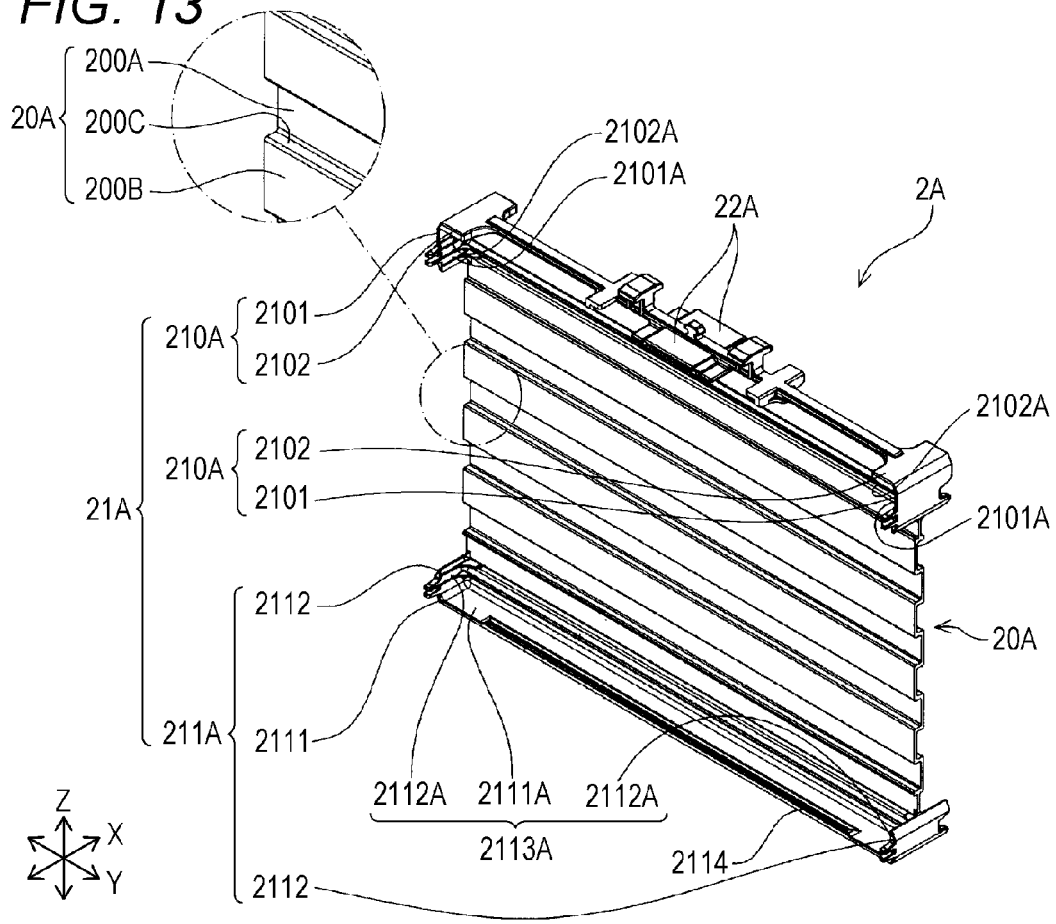
FIG. 13 is a perspective view of an inner spacer for energy storage devices.

Firstly, an inner spacer 2A is described by reference to FIG. 13 and FIG. 14. The inner spacer 2A includes: a base 20A arranged adjacently to the energy storage device 1 (a first wall 100c of a case body 100); and blocking portions 21A which suppress the positional displacement of the energy storage device 1 arranged adjacently to the base 20A with respect to the base 20A. The inner spacer 2A also includes a vent cover portion 22A which projects from the base 20A and is arranged on a lid plate 101 (gas release vent 101a) of the energy storage device 1.

The base 20A of the inner spacer 2A (hereinafter simply referred to as "base 20A") is sandwiched between two energy storage devices 1. That is, the energy storage device 1 is arranged on both sides of the base 20A in the X axis direction. The base 20A expands in the direction orthogonal to the X axis direction. The base 20A has: a first surface which faces one energy storage device 1 in an opposed manner out of the two energy storage devices 1 arranged adjacently to each other; and a second surface which is arranged on a side opposite to the first surface and faces the other energy storage device 1 in an opposed manner out of the two energy storage devices 1.

The base 20A has a first end which is arranged at a position corresponding to the lid plate 101 of the energy storage device 1, and a second end which is arranged on a side opposite to the first end and is arranged at a position corresponding to a closing portion 100a of the energy storage device 1. The base 20A also has a third end which is arranged at a position corresponding to one second wall 100d of the energy storage device 1, and a fourth end which is arranged on a side opposite to the third end and is arranged at a position corresponding to the other second wall 100d of the energy storage device 1.

The base 20A has a first corner portion which is a portion where the first end and the third end of the base 20A are connected to each other, and a second corner portion which is a portion where the first end and the fourth end are connected to each other. The base 20A also has a third corner portion which is a portion where the second end and the third end are connected to each other, and a fourth corner portion which is a portion where the second end and the fourth end are connected to each other.

Here, the first end and the second end of the base 20A extend in the Y axis direction. The third end and the fourth end of the base 20A extend in the Z axis direction. Accordingly, the base 20A has an approximately rectangular shape as viewed in the X axis direction. The base 20A has substantially the same size as the first wall 100c of the energy storage device 1 (a size corresponding to the size of the first wall 100c of the energy storage device 1).

In the energy storage apparatus according to this embodiment, a passage which allows a fluid (a fluid for cooling) to pass therethrough is formed in at least one of a position between the first surface of the base 20A and the energy storage device 1 and a position between the second surface of the base 20A and the energy storage device 1.

The cross section of the base 20A in this embodiment has a rectangular corrugated shape. The description is made more specifically. The base 20A includes: first abutting portions 200A which are brought into contact with only one energy storage device 1 out of two energy storage devices 1 arranged adjacently to each other; second abutting portions 200B which are brought into contact with only the other energy storage device 1 out of the two energy storage devices 1 arranged adjacently to each other; and joint portions 200C which connect the first abutting portions 200A and the second abutting portions 200B to each other. The first abutting portions 200A are elongated in the Y axis direction. The second abutting portions 200B are elongated in the Y axis direction.

The base 20A in this embodiment includes a plurality of first abutting portions 200A and a plurality of second abutting portions 200B. The first abutting portions 200A and the second abutting portions 200B are alternately arranged in the Z axis direction.

With such a configuration, in the energy storage apparatus, the passage is formed by the surface of the first abutting portion 200A on a side opposite to the surface of the first abutting portion 200A which is brought into contact with the energy storage device 1 and the pair of joint portions 200C which is connected to the first abutting portion 200A. Further, in the energy storage apparatus, the passage is formed by the surface of the second abutting portion 200B on a side opposite to the surface of the second abutting portion 200B which is brought into contact with the energy storage device 1 and the pair of joint portions 200C which is connected to the second abutting portion 200B.

The blocking portions 21A suppress (restrict) the positional displacement of the energy storage devices 1 arranged on both sides of the inner spacer 2A (base 20A) in the X axis direction with respect to the inner spacer 2A (base 20A) in a Y-Z plane (plane including the Y axis and the Z axis) direction. Accordingly, the blocking portions 21A restrict the relative movement between two energy storage devices 1 arranged adjacently to the inner spacer 2A. To be more specific, the blocking portions 21A extend to both sides in the X axis direction from the base 20. That is, the blocking portions 21A extend toward the energy storage device 1 arranged adjacently to the first surface of the base 20A of the inner spacer 2A from the base 20A, and also extend toward the energy storage device 1 arranged adjacently to the second surface of the base 20A of the inner spacer 2A from the base 20A.

The configuration is described more specifically. The blocking portion 21A is formed on a peripheral edge portion of the base 20A. The blocking portion 21A in this embodiment has a first blocking portion (blocking portion on the other end side) 210A which is brought into contact with an end portion (the other end portion) of the energy storage device 1 on a lid plate 101 side, and a second blocking portion (blocking portion on one end side) 211A which is brought into contact with an end portion (one end portion) of the energy storage device 1 on a closing portion 100a side.

The second blocking portion 211A extends toward the energy storage device 1 which is arranged adjacently to the first surface of the base 20A of the inner spacer 2A and toward the energy storage device 1 which is arranged adjacently to the second surface of the base 20A of the inner spacer 2A. The second blocking portion 211A is brought into contact with the closing portion 100a and one second wall 100d of the barrel portion 100b of the energy storage device 1 which is arranged on both sides of the base 20A of the inner spacer 2A.

To be more specific, on both sides of the base 20A in the X axis direction, the second blocking portion 211A includes: a first opposedly-facing portion 2111 having an opposedly-facing surface 2111A which faces a surface (one end surface) of the closing portion 100a of the energy storage device 1 in an opposed manner; a pair of second opposedly-facing portions 2112 which sandwiches the end portion of the energy storage device 1 on a closing portion 100a side therebetween in the Y axis direction; and a projecting ridge 2114 which projects toward the closing portion 100a of the energy storage device 1 from the opposedly-facing surface 2111A of the first opposedly-facing portion 2111 and extends in the Y axis direction. The first opposedly-facing portion 2111 extends from the base 20A in the X axis direction as well as in the Y axis direction. The second opposedly-facing portion 2112 extends from the base 20A in the X axis direction as well as in the Z axis direction. Both ends of the first opposedly-facing portion 2111 and the pair of second opposedly-facing portions 2112 are connected to each other at the third corner portion and the fourth corner portion of the base 20A (in other words, at two corner portions on the end portion of the energy storage device 1 on the closing portion 100a side).

Further, the second blocking portion 211A includes: an opposedly-facing surface 2113A having the opposedly-facing surface 2111A of the first opposedly-facing portion 2111 which faces the energy storage device 1 in an opposed manner; and opposedly-facing surfaces 2112A of the second opposedly-facing portions 2112 which face the energy storage device 1 in an opposed manner. The opposedly-facing surface 2113A of the second blocking portion 211A continuously extends, on both sides of the base 20A in the X axis direction, from one corner portion out of two corner portions on the end portion of the energy storage device 1 on the closing portion 100a side (for example, from a corner portion at a position corresponding to the third corner portion of the base 20A) to the other corner portion (for example, to a corner portion at a position corresponding to the second corner portion of the base 20A) so as to face the closing portion 100a of the energy storage device 1 in an opposed manner, and both end portions of the oppositely-facing surface 2113A are bent along the two corner portions. The oppositely-facing surfaces 2112A of the pair of second oppositely-facing portions 2112 which face the energy storage device 1 in an opposed manner may be formed into a flat surface, or have unevenness, projecting ridges or the like in conformity with a contact state with the energy storage device 1.

Figure 14:
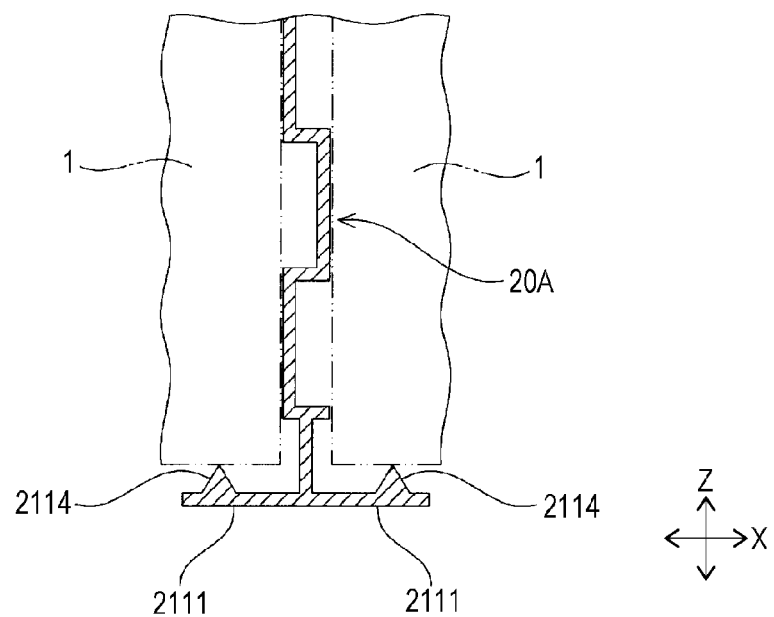
FIG. 14 is a cross-sectional view of a second blocking portion of the inner spacer and an area around the second blocking portion.

The second blocking portion 211A includes, on both sides in the X axis direction, the projecting ridge 2114 which extends in the Y axis direction and projects toward the closing portion 100a of the energy storage device 1 from the oppositely-facing surface 2113A of the second blocking portion 211A (see FIG. 14). The projecting ridge 2114 in this embodiment continuously extends in the Y axis direction from the one corner portion of the end portion of the energy storage device 1 on the closing portion 100a side to the other corner portion. Further, the projecting ridge 2114 has a triangular shape in cross section at respective positions thereof in the Y axis direction (in cross section in the X-Z plane direction).

The first blocking portion 210A extends toward the energy storage device (one energy storage device) 1 which is arranged adjacently to the first surface of the base 20A of the inner spacer 2A and toward the energy storage device (the other energy storage device) 1 which is arranged adjacently to the second surface of the base 20A of the inner spacer 2A. The first blocking portion 210A sandwiches the energy storage device 1 arranged adjacently to the base 20A together with the second blocking portion 211A by being brought into contact with the end portion of the energy storage device 1 on the lid plate 101 side.

To be more specific, the first blocking portion 210A includes, on both sides of the base 20A in the X axis direction, a pair of third oppositely-facing portions 2101 which sandwiches the end portion of the energy storage device 1 on the lid plate 101 side in the Y axis direction. The first blocking portion 210A in this embodiment includes, on both sides of the base 20A in the X axis direction, a pair of fourth oppositely-facing portions 2102 each having a sandwiching surface 2102A which is directed to the oppositely-facing surface 2111A of the first oppositely-facing portion 2111 in an opposed manner and sandwiches the energy storage device 1 together with the first oppositely-facing portion 2111. The pair of fourth oppositely-facing portions 2102 is disposed at positions corresponding to two corner portions on the end portion of the energy storage device 1 on the lid plate 101 side in a spaced-apart manner in the Y axis direction. One third oppositely-facing portion 2101 out of the pair of third oppositely-facing portions 2101 and one fourth oppositely-facing portion 2102 out of the pair of fourth oppositely-facing portions 2102 are connected to each other at the first corner portion of the base 20A. Further, the other third oppositely-facing portion 2101 out of the pair of third oppositely-facing portions 2101 and the other fourth oppositely-facing portion 2102 out of the pair of fourth oppositely-facing portions 2102 are connected to each other at the second corner portion of the base 20A. The first blocking portions 210A hold, on both sides of the base 20A in the X axis direction, the respective corner portions on both ends in the Y axis direction of the end portion of the energy storage device 1 on the lid plate 101 side. That is, since the two corner portions of the end portion of the energy storage device 1 on the lid plate 101 side are brought into contact with the first blocking portions 210A, the positional displacement in the Y-Z plane direction of the end portion of the energy storage device 1 on the lid plate 101 side with respect to the base 20A is restricted. The pair of sandwiching surfaces 2102A may be formed into a flat surface, or have unevenness, projecting ridges or the like in conformity with a contact state with the energy storage device 1. Further, the oppositely-facing surface 2101A of the third oppositely-facing portion 2101 with the energy storage device 1 may be also formed into a flat surface, or have unevenness, projecting ridges or the like in conformity with a contact state with the energy storage device 1.

In the inner spacer 2A having the above-mentioned configuration, in a state where the energy storage device 1 is not sandwiched between the first oppositely-facing portion 2111 and the fourth oppositely-facing portion 2102 (in a state where the energy storage device 1 and the inner spacer 2A are not engaged with each other by fitting engagement), a distance from the sandwiching surface 2102A of the fourth oppositely-facing portion 2102 to a peak of the projecting ridge 2114 (a distal end in the projecting direction) in the Z axis direction is smaller than the length of the energy storage device 1 in the Z axis direction. The inner spacer 2A in this embodiment is made of a resin. Accordingly, the inner spacer 2A is elastically deformable.

Therefore, in the inner spacer 2A in this embodiment, the energy storage device 1 can be fitted (held) between the first oppositely-facing portion 2111 (to be more specific, the projecting ridge 2114) and the fourth oppositely-facing portion 2102 (to be more specific, the sandwiching surface 2102A) by fitting engagement.

Further, in the inner spacer 2A in this embodiment, in a state where the energy storage device 1 is not sandwiched between the first oppositely-facing portion 2111 and the fourth oppositely-facing portion 2102, a distance from the sandwiching surface 2102A of the fourth oppositely-facing portion 2102 to the oppositely-facing surface 2111A of the first oppositely-facing portion 2111 in the Z axis direction is larger than the length of the energy storage device 1 in the Z axis direction.

The energy storage apparatus according to this embodiment includes the plurality of energy storage devices 1 as described above and hence, the inner spacer 2A is arranged between every adjacent energy storage devices 1. That is, the energy storage apparatus includes a plurality of inner spacers 2A. Further, with respect to the inner spacers 2A which are arranged adjacently to each other with the energy storage device 1 sandwiched therebetween, distal ends of the second blocking portions 211A in the X axis direction are brought into contact with each other. That is, in the energy storage apparatus of this embodiment, the closing portion 100a of each energy storage device 1 is covered with the second blocking portion 211A (to be more specific, the first oppositely-facing portion 2111).

According to the energy storage apparatus described heretofore, the inner spacer 2A includes the second blocking portion 211A to hold the end portions on a closing portion 100a side of the energy storage devices 1 which are arranged adjacently to the inner spacer 2A on both sides of the inner spacer 2A in the X axis direction (that is, the first oppositely-facing portion 2111 restricts the positional displacement of the energy storage devices 1 toward one side in the Z axis direction, and the pair of second oppositely-facing portions 2112 restricts the positional displacement of the end portions of the energy storage devices 1 on the closing portion 100a side in the Y axis direction by sandwiching the end portions on the closing portion 100a side) and hence, the inner spacers 2A and the energy storage devices 1 which are arranged adjacently to each other in the energy storage apparatus are surely engaged with each other so that the rigidity of the energy storage apparatus is increased as a whole. As a result, the vibration resistance of the energy storage apparatus is enhanced.

Further, in the energy storage apparatus of this embodiment, the projecting ridge 2114 which extends from the second blocking portion 211A in the Y axis direction is brought into contact with the energy storage device 1 and hence, a contact area between the first opposedly-facing portion 2111 and the energy storage device 1 in the X axis direction (first direction) can be suppressed. With such a configuration, the fitting engagement between the inner spacer 2A and the energy storage device 1 in the X axis direction can be facilitated.

In the energy storage apparatus of this embodiment, the first opposedly-facing portion 2111 and the second opposedly-facing portions 2112 are connected to each other at two corner portions on the end portion of the energy storage device 1 on the closing portion 100a side. With such a configuration, the rigidity of the inner spacer 2A per se is increased, and the whole end portion of the energy storage device 1 on the closing portion 100a side is held by the second blocking portion 211A and hence, the inner spacer 2A and the energy storage device 1 arranged adjacently to each other are further firmly engaged with each other whereby the rigidity of the energy storage apparatus is further increased as a whole.

In the energy storage apparatus of this embodiment, the projecting ridge 2114 extends continuously from one corner portion to the other corner portion on the end portion of the energy storage device 1 on the closing portion 100a side. With such a configuration, it is possible to sufficiently ensure a contact area between the second blocking portion 211A and the energy storage device 1 in the Y axis direction (second direction) while suppressing the contact area between the second blocking portion 211A and the energy storage device 1 in the X axis direction. Accordingly, the rigidity of the energy storage apparatus in an assembled state can be increased as a whole while maintaining the easiness of the fitting engagement between the inner spacer 2A and the energy storage device 1 at the time of assembling.

In the energy storage apparatus of this embodiment, the inner spacer 2A has the first blocking portion 210A and hence, it is possible to suppress the positional displacement of the energy storage device 1 arranged adjacently to the inner spacer 2A toward the other side in the Z axis direction with respect to the inner spacer 2A. That is, the inner spacer 2A can restrict (suppress) the positional displacement of the energy storage device 1 arranged adjacently to the inner spacer 2A in the Z axis direction with respect to the inner spacer 2A by the first blocking portion 210A and the second blocking portion 211A.

In the energy storage apparatus of this embodiment, the projecting ridge 2114 which is formed on the second blocking portion 211A has a triangular shape in cross section. Accordingly, by pushing the energy storage device 1 to the base in a state where the end portion of the energy storage device 1 on a lid plate 101 side is brought into contact with the first blocking portion 210A (to be more specific, the sandwiching surface 2102A) and the end portion of the energy storage device 1 on a closing portion 100a side is brought into contact with an inclined surface (inclined side of a triangular cross section) of the projecting ridge 2114, the end portion on the closing portion 100a side is guided to the peak (the distal end in the projecting direction) of the projecting ridge 2114 along the inclined surface. Therefore, the energy storage device 1 is fitted in a gap formed between the projecting ridge 2114 and the first blocking portion 210A. As describe above, according to the energy storage apparatus of this embodiment, the fitting engagement of the energy storage device 1 and the inner spacer 2A can be easily performed.

In the energy storage apparatus of this embodiment, the inner spacer 2A is constituted in an elastically deformable manner, and in a state where the energy storage device 1 is not sandwiched between the sandwiching surface 2102A and the first opposedly-facing portion 2111, a distance in the Z axis direction from the sandwiching surface 2102A to the distal end of the projecting ridge 2114 in the projecting direction is smaller than the length of the energy storage device 1 in the Z axis direction.

Further, a distance between the sandwiching surface 2102A and the projecting ridge 2114 is expanded (the inner spacer is elastically deformed) in a state where the energy storage device 1 is fitted in the inner spacer 2A. Accordingly, the energy storage device 1 is sandwiched between the sandwiching surface 2102A and the projecting ridge 2114 in the Z axis direction by an elastic restoring force of the inner spacer 2A (a force of the inner spacer 2A to return the inner spacer 2A to a state before being elastically deformed). Therefore, the inner spacer 2A and the energy storage device 1 are engaged with each other more firmly and, as a result, the rigidity of the energy storage apparatus is further increased.

Figure 15:
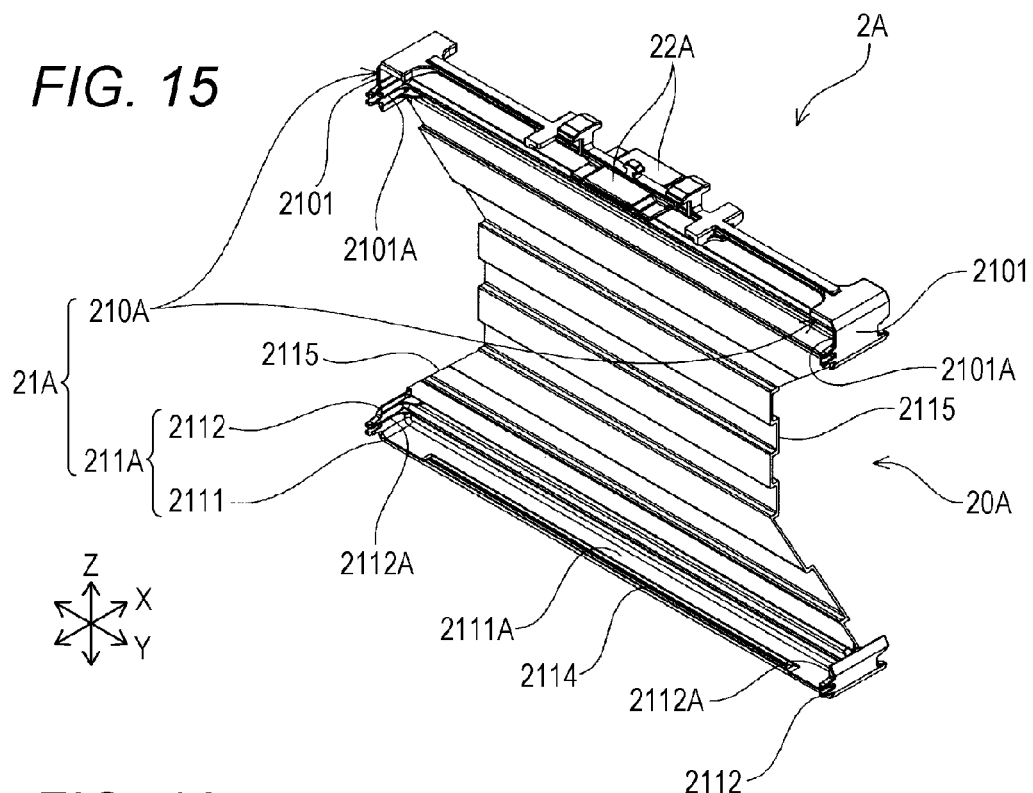
FIG. 15 is a view describing the configuration where edges of the inner spacer in a Y axis direction are in the inside of a first blocking portion and the second blocking portion.

In the base 20A of the inner spacer 2A in this embodiment, on both sides in the Y axis direction, edges (the third end and the fourth end) of the base 20A are arranged at the same positions as the opposedly-facing surfaces 2112A of the second opposedly-facing portions 2112. With such a configuration, rigidity of the base 20A (that is, the rigidity of the inner spacer 2A) is increased compared to the configuration where, on both sides of the inner spacer 2A in the Y axis direction, edges 2115 of the base 20A of the inner spacer 2A are arranged at least partially inside the opposedly-facing surfaces 2112A of the second opposedly-facing portions 2112 as shown in FIG. 15, for example. Accordingly, the rigidity of the energy storage apparatus is also increased as a whole.

Further, in the base 20A of the inner spacer 2A in this embodiment, on both sides in the Y axis direction, the edges (the first end and the second end) of the base 20A are arranged at the same positions as the opposedly-facing surfaces 2101A of the third facing portions 2101. With such a configuration, the rigidity of the base 20A (that is, the rigidity of the inner spacer 2A) is increased compared to the configuration where, on both sides of the inner spacer 2A in the Y axis direction, the edges 2115 of the base 20A of the inner spacer 2A are arranged at least partially inside the opposedly-facing surfaces 2101A of the third opposedly-facing portions 2101 as shown in FIG. 15, for example. Accordingly, the rigidity of the energy storage apparatus is also increased as a whole.

In the energy storage apparatus of this embodiment, with respect to the inner spacers 2A which are arranged adjacently to each other with the energy storage device 1 sandwiched therebetween, distal ends of the second blocking portions 211A of the inner spacers 2A in the X axis direction are brought into contact with each other. With such a configuration, the whole end surface of the end portion of the energy storage device 1 on a closing portion 100a side is covered with the second blocking portions 211A of the inner spacers 2A arranged on both sides of the energy storage device 1 and hence, the end portions of the energy storage devices 1 arranged in a row in the X axis direction on the closing portion 100a side are minimally short-circuited. That is, the insulating property is enhanced.

It is needless to say that the energy storage apparatus according to the present invention is not limited to the above-mentioned embodiment, and various modifications are conceivable without departing from the gist of the present invention.

Although the projecting ridge 2114 is formed on the second blocking portion 211A of the above-mentioned embodiment, the present invention is not limited to such a configuration. For example, provided that the second blocking portion 211A has the opposedly-facing surface 2111A of the first opposedly-facing portion 2111 and the opposedly-facing surfaces 2112A of the pair of second opposedly-facing portions 2112, the second blocking portion 211A may not always include the projecting ridge 2114. Also with such a configuration, the inner spacer 2A holds the whole end portions on a closing portion 100a side of the energy storage devices 1 arranged adjacently to both sides of the inner spacer 2A in the X axis direction by the opposedly-facing surface 2111A of the first opposedly-facing portion 2111 and the opposedly-facing surfaces 2112A of the pair of second opposedly-facing portions 2112. Accordingly, the inner spacers 2A and the energy storage devices 1 which are arranged adjacently to each other in the energy storage apparatus are surely engaged with each other so that the rigidity of the energy storage apparatus is increased as a whole and hence, the vibration resistance of the energy storage apparatus is enhanced.

In the energy storage apparatus of this embodiment, the projecting ridge 2114 continuously extends in the Y axis direction from one corner portion to the other corner portion on the end portion of the energy storage device 1 on the closing portion 100a side. However, the present invention is not limited to such a configuration. The projecting ridge 2114 of the second blocking portion 211A may be configured to extend intermittently in the Y axis direction. Also with such a configuration, a contact area between the second blocking portion 211A and the energy storage device 1 in the X axis direction can be suppressed.

In the energy storage apparatus of this embodiment, the second opposedly-facing portion 2112 of the second blocking portion 211A covers only the end portion on the closing portion 100a side of the second wall 100d of the energy storage device 1 in the Z axis direction. However, the present invention is not limited to such a configuration. For example, the second opposedly-facing portion 2112 may be configured to cover an area of the energy storage device 1 ranging from a position of the closing portion 100a to a center portion of the second wall 100d in the Z axis direction or may be configured to cover the whole second wall 100d. It is sufficient that the second opposedly-facing portions 2112 are connected to both ends of the first opposedly-facing portion 2111 in the Y axis direction.

Figure 16:
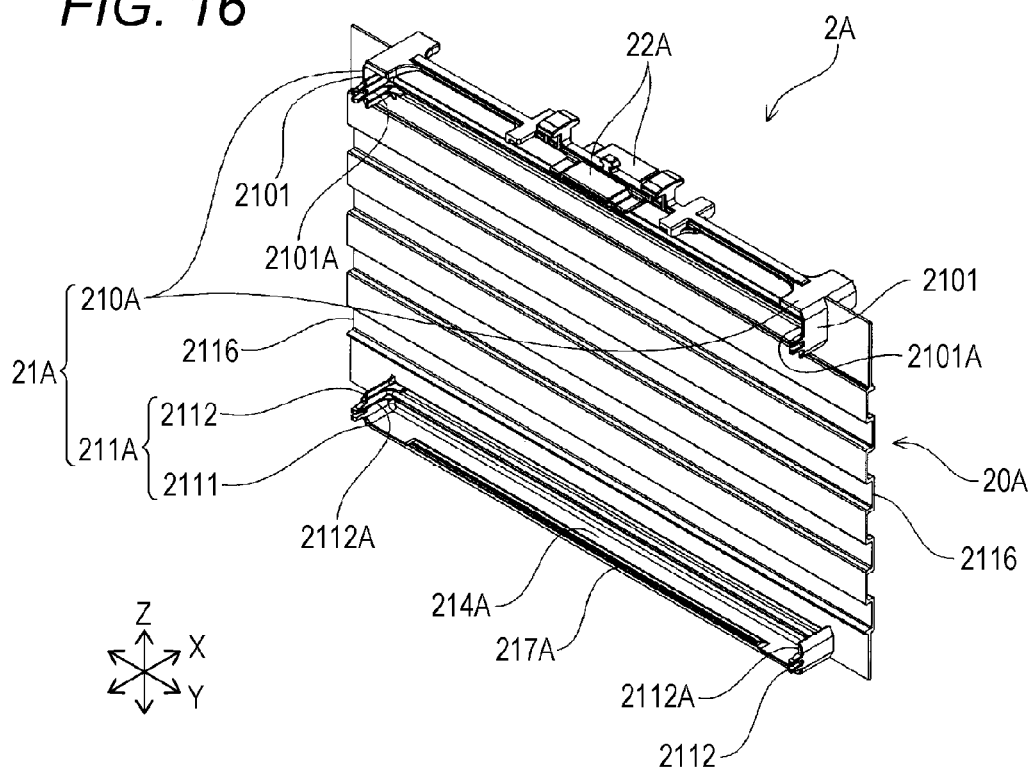
FIG. 16 is a view describing the configuration where the edges of the inner spacer in the Y axis direction are disposed outside of the first blocking portion and the second blocking portion.

In the base 20A of the inner spacer 2A according to the above-mentioned embodiment, on both sides in the Y axis direction, the edges (the third end and the fourth end) of the base 20A are arranged at the same positions as the opposedly-facing surfaces 2112A of the second opposedly-facing portions 2112. However, the present invention is not limited to such a configuration. For example, as shown in FIG. 16, edges 2116 of the base 20A of the inner spacer 2A in the Y axis direction may be arranged outside the opposedly-facing surfaces 2112A of the second opposedly-facing portions 2112. Also with such a configuration, the rigidity of the base 20A (that is, the rigidity of the inner spacer 2A) is increased compared to the configuration as shown in FIG. 15 where, on both sides in the Y axis direction, the edges 2115 of the base 20A of the inner spacer 2A are arranged at least partially inside the opposedly-facing surfaces 2112A of the second opposedly-facing portions 2112.

Further, in the base 20A of the inner spacer 2A according to the above-mentioned embodiment, on both sides in the Y axis direction, the edges (the first end and the second end) of the base 20A are arranged at the same positions as the opposedly-facing surfaces 2101A of the third opposedly-facing portions 2101. However, the present invention is not limited to such a configuration. For example, as shown in FIG. 16, the edges 2116 of the base 20A of the inner spacer 2A in the Y axis direction may be arranged outside the opposedly-facing surfaces 2101A of the third opposedly-facing portions 2101. Also with such a configuration, the rigidity of the base 20A (that is, the rigidity of the inner spacer 2A) is increased compared to the configuration as shown in FIG. 15 where, on both sides in the Y axis direction, the edges 2115 of the base 20A of the inner spacer 2A are arranged at least partially inside the opposedly-facing surfaces 2101A of the third opposedly-facing portions 2101. Accordingly, the rigidity of the energy storage apparatus is increased as a whole.

In the above-mentioned embodiment, the base 20A of the inner spacer 2A has an approximately rectangular shape, and has a size substantially equal to the size of the first wall 100c of the energy storage device 1. However, provided that the base 20A of the inner spacer 2A is configured so as to make respective postures of every two energy storage devices 1 arranged adjacently to the inner spacer 2A correspond to each other, the shape of the base 20A of the inner spacer 2A is not limited to the approximately rectangular shape, and the size of the base 20A of the inner spacer 2A is also not limited to the size substantially equal to the size of the first wall 100c of the energy storage device 1.

In the above-mentioned embodiment, the base 20A of the inner spacer 2A forms a passage between the base 20A and the energy storage device 1 by forming the base 20A into a rectangular corrugated shape. However, provided that the base 20A of the inner spacer 2A allows a fluid to pass through between the first surface and the energy storage device 1 (between the second surface and the energy storage device 1), the shape of the base 20A is not limited to the rectangular corrugated shape. Further, in the case where it is unnecessary to form a passage between the base 20A of the inner spacer 2A and the energy storage device 1, the base 20A of the inner spacer 2A may be formed into a flat plate shape.

What is claimed is:

1. An energy storage apparatus comprising:
   an energy storage device; and
   a first spacer and a second spacer that sandwich the electric storage device in a first direction,
   wherein each of the first and second spacers comprises:
      a passage forming portion that forms a passage for passing cooling air in a second direction that is perpendicular to the first direction; and
      a passage blocking portion disposed at one end in the second direction and including a first blocking member which extends along the first direction and a third direction which is perpendicular to the first and second directions, and
   wherein, in a view along the third direction, the first blocking members of the first and second spacers overlap, a gap being formed between the first blocking members by an overlapping portion of the first blocking members.

2. The energy storage apparatus according to claim 1, wherein each of the first and second spacers includes at least one projecting portion which projects in the second direction from the passage blocking portion and is brought into contact with the energy storage device which faces the passage blocking portion in an opposed manner.

3. The energy storage apparatus according to claim 2, wherein the projecting portion of the passage blocking portion of the first spacer and the projecting portion of the passage blocking portion of the second spacer are arranged so as to partially overlap with each other as viewed in the third direction.

4. The energy storage apparatus according to claim 1, wherein the passage blocking portion of the first spacer includes a projection which projects toward the passage blocking portion of the second spacer, and the passage blocking portion of the second spacer includes a recess corresponding to the projection.

5. The energy storage apparatus according to claim 1, wherein each of the first and second spacers further includes:
a base which extends in the second and third directions, the base being configured such that the energy storage device is arranged on a side of the base in the first direction,
wherein the passage blocking portion is configured to suppress positional displacement of the energy storage device with respect to the base by being brought into contact with an end surface of the energy storage device,
wherein the passage blocking portion includes:
a first opposedly-facing portion having an opposedly-facing surface which faces the end surface of the energy storage device in an opposed manner;
a pair of second opposedly-facing portions which sandwiches in the second direction orthogonal to the first direction and the third direction an end portion including the one end surface of the energy storage device; and
a projecting ridge which projects toward the end surface of the energy storage device from the opposedly-facing surface and extends in the second direction.

6. The energy storage apparatus according to claim 1, wherein the passage blocking portion further comprises a second blocking member which extends along the first and second directions, forms a right angle with the first blocking member and includes an edge which is joined to an edge of the first blocking member along the second direction.

7. The energy storage apparatus according to claim 6, wherein the first blocking member restricts a movement of the energy storage device in the second direction, and the second blocking member restricts a movement of the energy storage device in the third direction.

8. The energy storage apparatus according to claim 1, wherein the first blocking member of the first spacer comprises a plate-shaped blocking member and includes a plate-shaped projection which projects toward the first blocking member of the second spacer.

9. The energy storage apparatus according to claim 8, wherein the projection of the first blocking member of the first spacer engages a recessed portion of the first blocking member of the second spacer, such that a gap is formed between the projection and the recessed portion.

10. The energy storage apparatus according to claim 9, wherein the gap comprises the path for cooling air between the first blocking members, and the path extends in the first and third directions.

11. The energy storage apparatus according to claim 10, wherein the path for cooling air between the first blocking members comprises:
a first portion extending in the third direction;
a second extending in the first direction; and
a bend connecting the first and second portions.

12. The energy storage apparatus according to claim 8, wherein the projection comprises a distal end having a first width in the third direction, and a proximal end having a second width in the third direction greater than the first width.

13. The energy storage apparatus according to claim 1, wherein the first spacer further comprises a base which is formed on a side of the energy storage device, and
wherein the first blocking member of the first spacer comprises:
a main body which is connected to a side of the base and includes a first portion extending from the base in the first direction toward the energy storage device, and a second portion extending from the base in the first direction away from the energy storage device;
a projection which projects from the first portion in the first direction; and
a recessed portion formed in the second portion and having a shape which corresponds to a shape of the projection.

14. The energy storage apparatus according to claim 13, wherein the base comprises four corner portions and the passage blocking portion comprises four passage blocking portions that are formed at the four corner portions, respectively.

15. The energy storage apparatus according to claim 1, further comprising:
a projecting portion which projects from the first blocking member in the second direction and extends in the first direction, the projecting portion contacting the energy storage device and restricting a flow of cooling air in the third direction.

16. The energy storage apparatus according to claim 1, wherein the passage forming portion comprises:
a first support portion extending in the first and second directions;
a second support portion extending in the first and second directions and separated from the first support portion in the third direction; and
a connecting portion which extends in the second and third directions and includes a first edge which is joined to an edge of the first support portion along the second direction, and a second edge which is joined to an edge of the second support portion along the second direction, and
wherein the first and second support portions project in the first direction away from the energy storage device, so that the passage for passing cooling air is formed between the connecting portion and the energy storage device.

17. The energy storage apparatus according to claim 16, further comprising:
an other energy storage device, the first spacer being formed between the energy storage device and the other energy storage device in the first direction,
wherein a distance between the energy storage device and the other energy storage device is substantially the same as a width of the first and second support portions.

18. The energy storage apparatus according to claim 17, wherein the first spacer further comprises:

an other passage forming portion including other first and second support portions projecting in the first direction away from the other energy storage device, and an other connecting portion connecting the other first and second support portions, so that an other passage for passing cooling air is formed between the other connecting portion and the other energy storage device, wherein the passage for passing cooling air comprises a plurality of passages, and the other passage for passing cooling air comprises a plurality of other passages, and wherein the passages and the other passages are alternately arranged in the third direction.

19. An energy storage apparatus comprising:

an energy storage device; and a first spacer formed on a first side of the energy storage device in a first direction and including:
  a first base extending in a second direction perpendicular to the first direction, and a third direction perpendicular to the first and second directions; and
  a first member formed at an end of the first base in the second direction and extending in the first and third directions; and a second spacer formed on a second side of the energy storage device opposite the first side, and including:
  a second base extending in the second and third directions; and
  a second member formed at an end of the second base in the second direction and extending in the first and third directions, and in a view along the third direction, the first member overlaps the second member, and a gap is formed between the first and second members by an overlapping portion of the first and second members.

20. An energy storage apparatus comprising:

an energy storage device; and a first spacer and a second spacer that sandwich the electric storage device in a first direction, wherein each of the first and second spacers comprises:
  a passage forming portion that forms a passage for passing cooling air in a second direction that is perpendicular to the first direction; and
  a passage blocking portion disposed at one end in the second direction and including a first blocking member which extends along the first direction and a third direction which is perpendicular to the first and second directions, and wherein, in a view along the third direction, the first blocking members of the first and second spacers overlap, an overlapping portion of the first blocking members forming a path for cooling air between the first blocking members.

* * * * *